US012153165B2

(12) United States Patent
Pan et al.

(10) Patent No.: US 12,153,165 B2
(45) Date of Patent: Nov. 26, 2024

(54) LiDAR ASSEMBLY WITH MODULARIZED COMPONENTS

(71) Applicant: BEIJING VOYAGER TECHNOLOGY CO., LTD., Beijing (CN)

(72) Inventors: Anan Pan, Fremont, CA (US); Henghui Jiang, Newark, CA (US); Ming-Hui Wu, Mountain View, CA (US); Youmin Wang, Berkeley, CA (US)

(73) Assignee: BEIJING VOYAGER TECHNOLOGY CO., LTD., Beijing (CN)

( * ) Notice: Subject to any disclaimer, the term of this patent is extended or adjusted under 35 U.S.C. 154(b) by 1005 days.

(21) Appl. No.: 17/134,286

(22) Filed: Dec. 26, 2020

(65) Prior Publication Data

US 2022/0179051 A1 Jun. 9, 2022

Related U.S. Application Data

(63) Continuation-in-part of application No. 17/115,787, filed on Dec. 8, 2020.

(51) Int. Cl.
| | |
|---|---|
| *G01S 7/481* | (2006.01) |
| *G01S 17/89* | (2020.01) |
| *G01S 17/931* | (2020.01) |
| *G01S 7/483* | (2006.01) |
| *G01S 7/491* | (2020.01) |

(52) U.S. Cl.
CPC ............ *G01S 7/4813* (2013.01); *G01S 17/89* (2013.01); *G01S 17/931* (2020.01); *G01S 7/483* (2013.01); *G01S 7/491* (2013.01)

(58) Field of Classification Search
CPC ........ G01S 7/4813; G01S 7/483; G01S 17/89; G01S 17/931; G01S 7/491; G01S 17/86; G01S 7/4817
USPC ....................................... 356/4.01
See application file for complete search history.

(56) References Cited

U.S. PATENT DOCUMENTS

| | | | | |
|---|---|---|---|---|
| 6,957,650 | B2 * | 10/2005 | Nyhart, Jr. ............ | H01L 31/055 126/621 |
| 8,767,190 | B2 * | 7/2014 | Hall ........................ | G01S 17/89 356/9 |
| 9,596,387 | B2 * | 3/2017 | Achenbach ............ | H04N 23/51 |

\* cited by examiner

*Primary Examiner* — Daniel L Murphy
(74) *Attorney, Agent, or Firm* — BAYES PLLC

(57) ABSTRACT

Embodiments of the disclosure provide an integrated transmitter-receiver module for a LiDAR assembly. The integrated transmitter-receiver module includes a laser emitter configured to emit optical signals to an environment surrounding the LiDAR assembly. The integrated transmitter-receiver module also includes a receiver configured to detect returned optical signals from the environment. The laser emitter and the receiver are pre-aligned to focus the returned optical signal on one or more detectors of the receiver and are disposed on a shared base wherein the shared base is configured to assemble the integrated transmitter-receiver module to the LiDAR assembly.

20 Claims, 22 Drawing Sheets

1300

| Emit optical signals to an environment surrounding the LiDAR assembly | S1302 |

↓

| Scan the emitted optical signals | S1304 |

↓

| Detect returned optical signals from the environment | S1306 |

FIG. 13

LiDAR ASSEMBLY WITH MODULARIZED COMPONENTS

CROSS-REFERENCE TO RELATED APPLICATIONS

This is a continuation in part of U.S. application Ser. No. 17/115,787, filed Dec. 8, 2020, which is incorporated by reference in its entirety herein. This application is also related to the following applications, both of which are incorporated by reference in their entireties herein:

Application Ser. No. 17/134,298, filed Dec. 26, 2020, and entitled "LIDAR ASSEMBLY WITH MODULARIZED COMPONENT"; and Application Ser. No. 17/134,302, filed Dec. 26, 2020, and entitled "LIDAR ASSEMBLY WITH MODULARIZED COMPONENT".

TECHNICAL FIELD

The present disclosure relates to a light detection and ranging (LiDAR) system, and more particularly to, a LiDAR assembly with modularized components.

BACKGROUND

Optical sensing systems such as LiDAR systems have been widely used in advanced navigation technologies, such as to aid autonomous driving or to generate high-definition maps. For example, a typical LiDAR system measures the distance to a target by illuminating the target with pulsed laser light beams and measuring the reflected pulses with a sensor such as a photodetector or a photodetector array. Differences in laser light return times, wavelengths, and/or phases can then be used to construct digital three-dimensional (3D) representations of the target. Because using a narrow laser beam as the incident light can map physical features with very high resolution, a LiDAR system is particularly suitable for applications such as sensing in autonomous driving and high-definition map surveys.

To perform the measurement, a LiDAR system includes many key components such as emitter(s), detector(s), power supplier(s), controller(s), to name a few. In existing LiDAR assemblies, because the components are normally arranged in an ad hoc manner, they lack accessibility and removability. For example, it is hard to replace one or more components of the LiDAR system without disassembling the entire LiDAR system. Moreover, because of the arrangement, cables connecting those components are messy. As a result, when one or more components need to be removed (e.g., the component calls for a replacement, maintenance, and/or an update), the entire LiDAR system must be disassembled. Also, the messy cables make the assembly of the LiDAR system not production friendly.

Embodiments of the disclosure address the above problems by a LiDAR assembly with modularized components.

SUMMARY

In one example, embodiments of the disclosure include an integrated transmitter-receiver module for a LiDAR assembly. The integrated transmitter-receiver module includes a laser emitter configured to emit optical signals to an environment surrounding the LiDAR assembly. The integrated transmitter-receiver module also includes a receiver configured to detect returned optical signals from the environment. The laser emitter and the receiver are pre-aligned to focus the returned optical signal on one or more detectors of the receiver and are disposed on a shared base wherein the shared base is configured to assemble the integrated transmitter-receiver module to the LiDAR assembly.

In another example, embodiments of the disclosure include a method for making an integrated transmitter-receiver module for a LiDAR assembly. The method includes aligning a laser emitter configured to emit optical signals to an environment surrounding the LiDAR assembly and a receiver configured to detect returned optical signals from the environment, such that the returned optical signals are focused on one or more detectors of the receiver. The method also includes integrating the aligned laser emitter and the receiver on a shared base to form the integrated transmitter-receiver module.

In a further example, embodiments of the disclosure include a method for assembling an integrated transmitter-receiver module to a LiDAR assembly. The integrated transmitter-receiver module includes a laser emitter and a receiver pre-aligned and disposed on a shared base. The method includes securing the integrated transmitter-receiver module through the shared base to a pair of guideways on a frame of the LiDAR assembly. The method also includes sliding the integrated transmitter-receiver module on the pair of guideways to a predetermined position on the frame. The method further includes affixing the integrated transmitter-receiver module to the frame through the pair of guideways after the integrated transmitter-receiver module reaches the predetermined position on the frame.

It is to be understood that both the foregoing general description and the following detailed description are exemplary and explanatory only and are not restrictive of the invention, as claimed.

BRIEF DESCRIPTION OF THE DRAWINGS

FIG. 13 shows a flow chart of an exemplary optical sensing method performed by a LiDAR assembly with modularized components, according to embodiments of the present disclosure.

DETAILED DESCRIPTION

Figure 1:
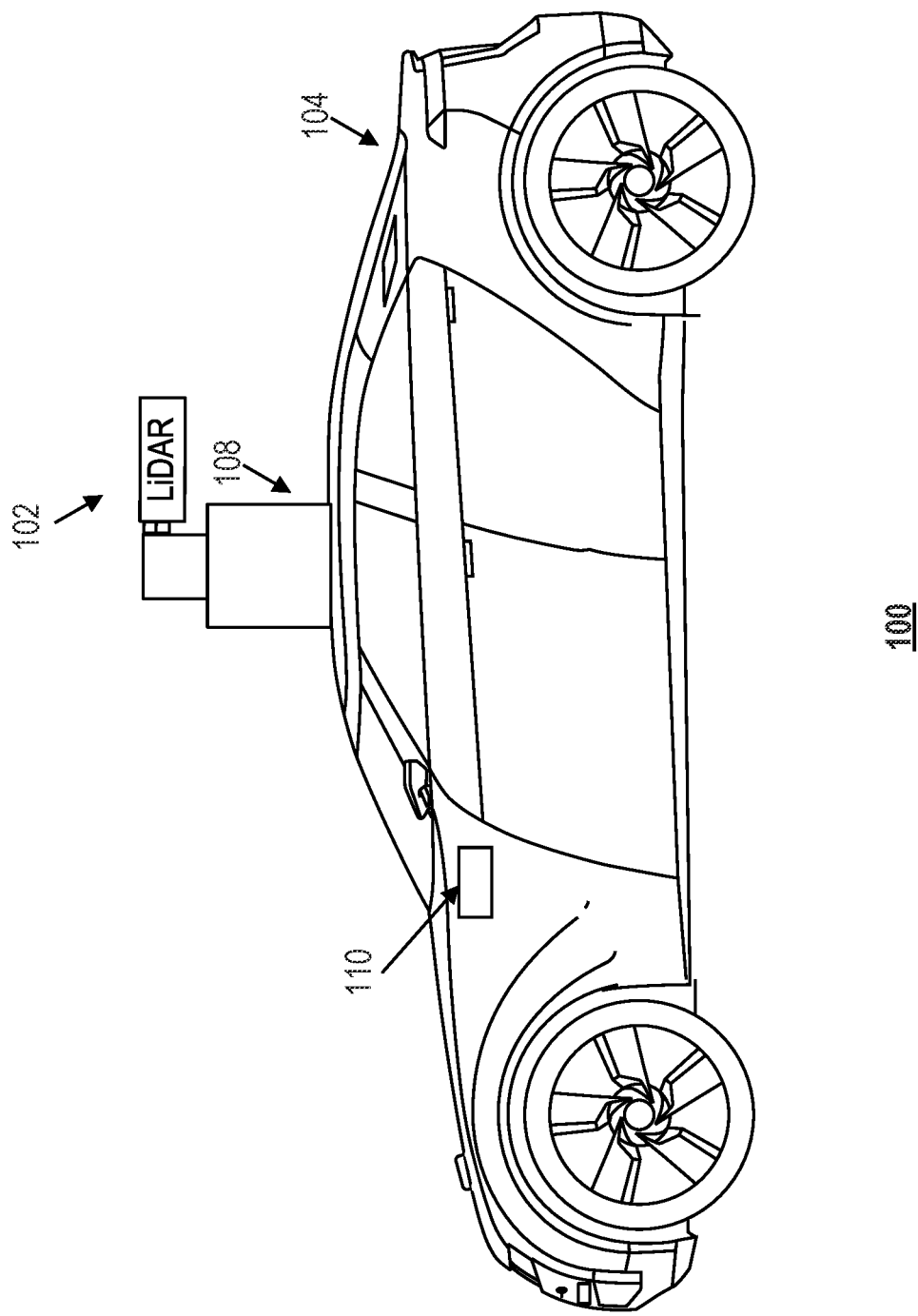
FIG. 1 illustrates a schematic diagram of an exemplary vehicle equipped with a LiDAR assembly with modularized components, according to embodiments of the present disclosure.

Reference will now be made in detail to the exemplary embodiments, examples of which are illustrated in the accompanying drawings. Wherever possible, the same reference numbers will be used throughout the drawings to refer to the same or like parts.

The optical sensing system (e.g., a LiDAR system) may be used to scan objects, and the detecting result (e.g., point cloud data) can be used for advanced navigation technologies, such as to aid autonomous driving or to generate high-definition maps. For example, the optical sensing system may include a transmitter configured to emit optical beams (e.g., laser beams) steered by a scanning module to scan an object and a receiver configured to receive/detect optical beams reflected by the object. The optical sensing system may also include a control module (e.g., a controller) for controlling the transmitter, the receiver, and the scanning module to scan the object and for processing the detected optical beams to obtain detecting results such as point cloud data. The optical sensing system may further include a power module configured to provide electrical power to the optical sensing system.

As will be disclosed in detail below, the optical sensing system (e.g., the LiDAR assembly with modularized components) disclosed herein has modularized components each affixed to an individual bracket (e.g., being modularized) before being positioned in the optical sensing system. In some embodiments, the modularized components are positioned on a specifically designed frame to ensure their predetermined positions. For example, when assembling the optical sensing system, the transmitter and the receiver may be pre-affixed on a same bracket to form an integrated transmitter-receiver module which is then positioned to the frame by sliding the bracket to a pair of guideways mounted on the frame. The relative positions of those modules are also specifically designed to provide quick assembly and easy access to each of the modules.

In some embodiments, the frame may have a plurality of opens on more than one faces and is manufactured in one piece without mechanical connections therebetween. As the frame for positioning the modules is manufactured from a single piece of metal instead of consisting of many pieces fastened or otherwise connected together, no extra torque is introduced to the system by the frame itself. This eases the alignment and calibration of the LiDAR assembly for installment. Also, the plurality of openings in more than one face of the frame further increase the accessibility and removability of each module within the LiDAR assembly. The increased accessibility and removability of each component can make the replacement and/or upgrade of the modules much easier than existing LiDAR system architectures and can facilitate quick assembly and reliable manufacturing of the LiDAR assembly in mass production.

Furthermore, to facilitate the communication between and among the components (e.g., increase the robustness of data transmission) and reduce space occupied by individual modules, the optical sensing system may further include an interface module operatively coupled to the above-mentioned modules for transmitting data and providing electrical power.

When being used in the above-mentioned applications (e.g., aid autonomous driving or generate high-definition maps), the optical sensing system can be equipped on a vehicle. For example, FIG. 1 illustrates a schematic diagram of an exemplary vehicle equipped with a LiDAR assembly with modularized components, according to embodiments of the present disclosure. Consistent with some embodiments, vehicle 100 may be a survey vehicle configured for acquiring data for constructing a high-definition map or 3-D buildings and city modeling. Vehicle 100 may also be an autonomous driving vehicle.

As illustrated in FIG. 1, vehicle 100 may be equipped with a LiDAR assembly with modularized components 102 (also referred to as "LiDAR assembly 102" hereinafter) mounted to a body 104 via a mounting structure 108. Mounting structure 108 may be an electro-mechanical device installed or otherwise attached to body 104 of vehicle 100. In some embodiments of the present disclosure, mounting structure 108 may use screws, adhesives, or another mounting mechanism. Vehicle 100 may be additionally equipped with a sensor 110 inside or outside body 104 using any suitable mounting mechanisms. Sensor 110 may include sensors used in a navigation unit, such as a Global Positioning System (GPS) receiver and one or more Inertial Measurement Unit (IMU) sensors. It is contemplated that the manners in which LiDAR assembly 102 or sensor 110 can be equipped on vehicle 100 are not limited by the example shown in FIG. 1 and may be modified depending on the types of LiDAR assembly 102 and sensor 110 and/or vehicle 100 to achieve desirable 3D sensing performance.

Consistent with some embodiments, LiDAR assembly 102 and sensor 110 may be configured to capture data as vehicle 100 moves along a trajectory. For example, a transmitter of LiDAR assembly 102 may be configured to scan the surrounding environment. LiDAR assembly 102 measures distance to a target by illuminating the target with laser beams and measuring the reflected/scattered pulses with a receiver. The laser beams used for LiDAR assembly 102 may be ultraviolet, visible, or near-infrared, and may be pulsed or continuous wave laser beams. In some embodiments of the present disclosure, LiDAR assembly 102 may capture point clouds including depth information of the objects in the surrounding environment, which may be used for constructing a high-definition map or 3-D buildings and city modeling. As vehicle 100 moves along the trajectory, LiDAR assembly 102 may continuously capture data including the depth information of the surrounding objects (such as moving vehicles, buildings, road signs, pedestrians, etc.) for map, building, or city modeling construction.

Figure 2:
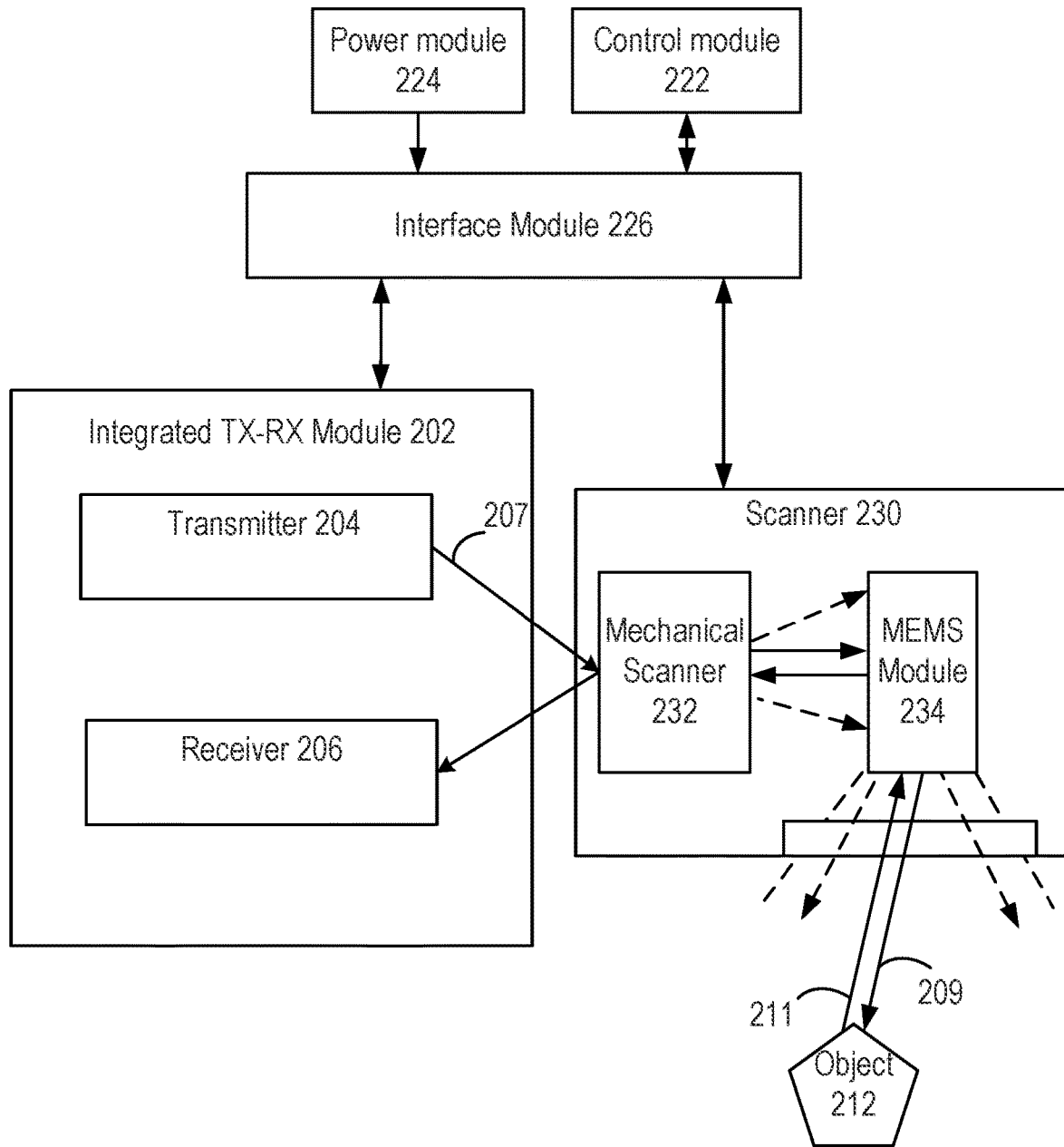
FIG. 2 illustrates a block diagram of an exemplary LiDAR assembly with modularized components, according to embodiments of the present disclosure.

FIG. 2 illustrates a block diagram of an exemplary LiDAR assembly 102 with modularized components, according to embodiments of the present disclosure. As illustrated, LiDAR assembly 102 may include an integrated transmitter-receiver module 202 and a scanner 230 coupled to integrated transmitter-receiver module 202. Integrated transmitter-receiver module 202 may include transmitter and receiver components integrated into a single package. For example, integrated transmitter-receiver module 202 may include transmitter 204 and receiver 206 sharing a same base and affixed to a same bracket.

In some embodiments, each of transmitter 204 and receiver 206 may further include its specific components (not shown). For instance, transmitter 204 may further include a laser emitter for emitting optical signals and optics for shaping the emitted optical signals. For another instance, receiver 206 may include receiving lens for collecting the returned optical signals from scanner 230 and detectors for detecting the returned optical signal collected by the lens. Receiver 206 may further include a readout circuit for converting the detected signal to an electrical signal for further processing, e.g., by a control module 222 of LiDAR assembly 102.

Specifically, transmitter 204 may emit optical beams (e.g., pulsed laser beams, continuous wave (CW) beams, frequency modulated continuous wave (FMCW) beams) to scanner 230. Transmitter 204 may include one or more laser sources (e.g., a laser emitter) and one or more optics. According to one example, transmitter 204 may sequentially emit a stream of laser beams to a scanner 230 which would later scan the stream of laser beams in different directions within and collectively forming a filed-of-view (FOV) (now shown).

In some embodiments, the emitted laser beam may be received and scanned by scanner 230. In some embodiments, as shown in FIG. 2, scanner 230 may include a mechanical scanning module 232 for scanning a first dimension and a MEMS scanning module 234 for scanning a second dimension, orthogonal to the first dimension. In some embodiments, mechanical scanning module 232 may include at least one of a galvanometer mirror, a mirror polygon, or flash lens driven/steered by a mechanical device for scanning a slow axis of the FOV with a sawtooth scanning trajectory or a triangle scanning trajectory. MEMS scanning module 234 may include a mirror or a mirror array driven/steered by MEMS devise(s) for scanning a fast axis of the FOV with a sinusoidal scanning trajectory. It is contemplated that the type of mirror, the driving mechanism, and the scanning trajectory are not limited to the examples described herein. Any suitable scanning mechanisms not departing from the spirit and scope of the present disclosure may be implemented by scanner 230 for scanning the FOV at a proper range of detection angles. For example, scanner 230 may use MEMS mirrors for scanning both dimensions.

In some embodiments, object 212 within the FOV may be made of a wide range of materials including, for example, non-metallic objects, rocks, rain, chemical compounds, aerosols, clouds and even single molecules. In some embodiments, at each time point during the scan, scanner 230 may scan laser beams 209 to object 212 in a direction within a range of scanning angles by rotating the deflector(s) (e.g., mirror(s)) in mechanical scanning module 232 and/or MEMS scanning module 234).

Receiver 206 may be configured to detect returned laser beams 211 returned from object 212. Upon contact, laser beams can be reflected/scattered by object 212 via backscattering, such as Rayleigh scattering, Mie scattering, Raman scattering, and fluorescence. Returned laser beams 211 may be in a same or different direction from laser beams 209. The pulses in returned laser beam 211 may have the same waveform (e.g., bandwidth and wavelength) as those in laser beams 209. In some embodiments, scanner 230 may collect laser beams returned from object 212 and direct returned laser beams 211 to receiver 206. Upon receiving returned laser beams 211 from scanner 230, receiver 206 may output electrical signals reflecting the intensity of returned laser beams 211.

In some embodiments, receiver 206 may include lens, a detector (e.g., a photodetector), and a readout circuit. For example, the lens may be configured to collect returned laser beams 211 directed by scanner 230 in a respective direction and converge returned laser beams 211 to focus on the detector. At each time point during the scan, returned laser beams 211 directed by scanner 230 may be collected by the lens. The detector may be configured to detect returned laser beams 211 converged by the lens. In some embodiments, the detector may convert the laser light (e.g., returned laser beams 211) into electrical signals (e.g., currents or voltage signals). The readout circuit may be configured to integrate, amplify, filter, and/or multiplex the signal detected by the detector and transfer the integrated, amplified, filtered, and/or multiplexed signal onto output parts (e.g., control module 222) for readout.

Control module 222 may be configured to control integrated transmitter-receiver module 202 (e.g., control transmitter 204 and/or receiver 206) and scanner 230 (e.g., control mechanical scanning module 232 and/or MEMS scanning module 234) to perform detection/sensing operations. For instance, control module 222 may control the laser emitter of control transmitter 204 to emit laser beams 207, mirror(s) of mechanical scanning module 232 and/or MEMS scanning module 234 to rotate to scan the FOV, and the detector of receiver 206 to detect returned laser beams 211. In some embodiments, control module 222 may also implement data acquisition and analysis. For instance, control module 222 may collect digitalized signal information from the readout circuit of the receiver, determine the distance of object 212 from LiDAR assembly 102 according to the travel time of laser beams, and construct a high-definition map or 3-D buildings and city modeling surrounding LiDAR assembly 102 based on the distance information of object(s) 212.

In some embodiments, control module 222 may include components (not shown) such as a processor, a memory, and a storage for performing various control functions. In some embodiments, these components of control module 222 may be implemented on an integrated circuit (IC), for example, an application-specific integrated circuit (ASIC) or a field-programmable gate array (FPGA)) disposed on a printed circuit board (PCB).

Power module 224 may be configured to provide electrical power to modules such as integrated transmitter-receiver module 202, scanner 230, and/or control module 222. In some embodiments, power module 224 may include a DC power supply, an AC power supply, or any other power supply that can provide suitable voltage, current, and frequency to electrically power the modules.

In some embodiments, to facilitate the communication (e.g., transmission of control signals and/or obtained data) between and among the modules and/or with an outside device (e.g., a processing device and/or a manifestation device), LiDAR assembly 102 may further include an interface module 226 electrically connecting acquisition modules such as integrated transmitter-receiver module 202 and/or scanner 230 to control module 222 for transmitting data. Integrated transmitter-receiver module 202, scanner 230, and/or control module 222 may also be electrically connected to power module 224 through interface module 226 for receiving electrical power. For example, instead of having interfaces for transmitting data and/or receiving electrical power on each module individually, modules such as integrated transmitter-receiver module 202, scanner 230, and/or control module 222 may share the interface circuits integrated on interface module 226. This can further free up the space occupied by those modules. As will be described in detail below, interface module 226 may include a PCB for providing support, mounting, and protections to the integrated interface circuits. Having interface module 226 can avoid the messy connecting cables, providing optimal cable routing and component connection, while increasing the robustness of data transmission. In some embodiments, interface module 226 may further be connected to an external connector of an outside device for further processing or manifesting the acquired data.

As will be described in detail along with the description of FIGS. 3A-10, the above-mentioned modules may be positioned to predetermined positions of LiDAR assembly 102 by being affixed to a custom designed one-piece frame using different positioning mechanisms.

Figure 3A:
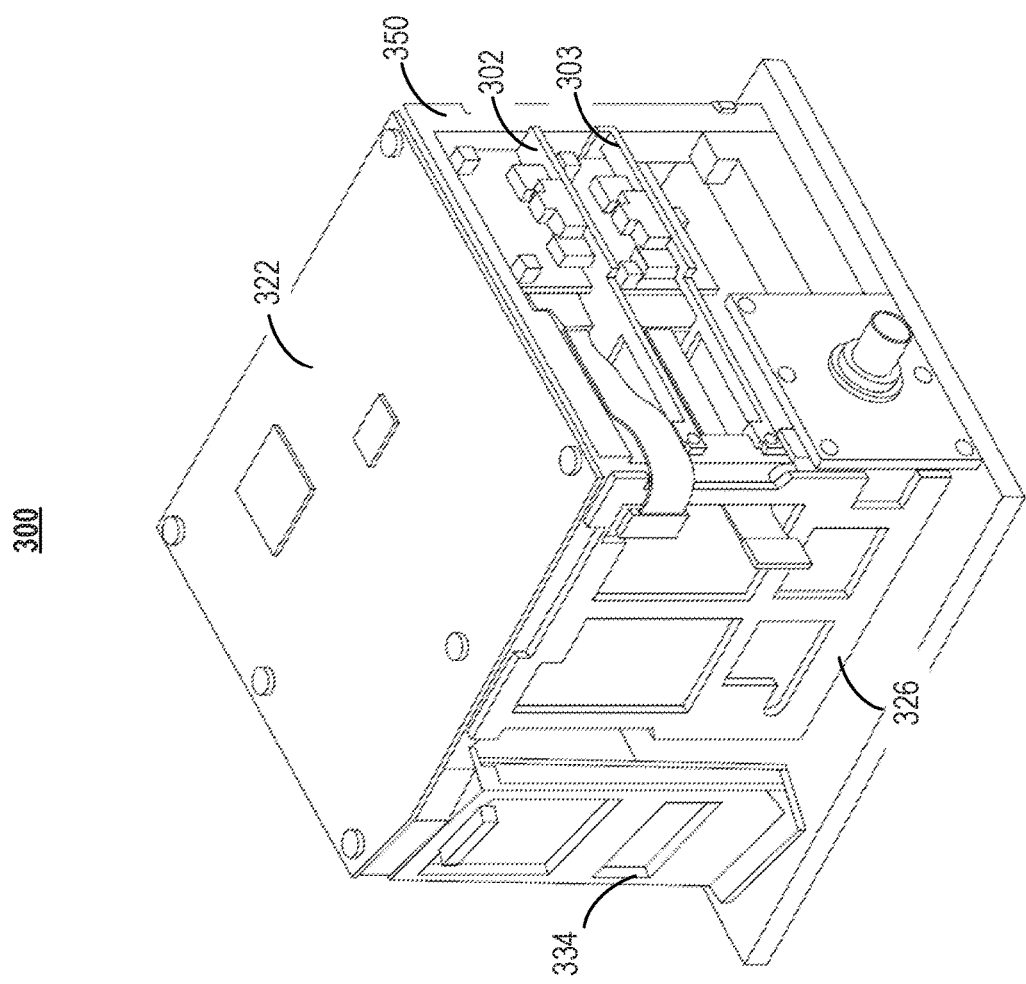
FIGS. 3A-3B illustrate an exemplary LiDAR assembly with modularized components, according to embodiments of the present disclosure.
Figure 3B:
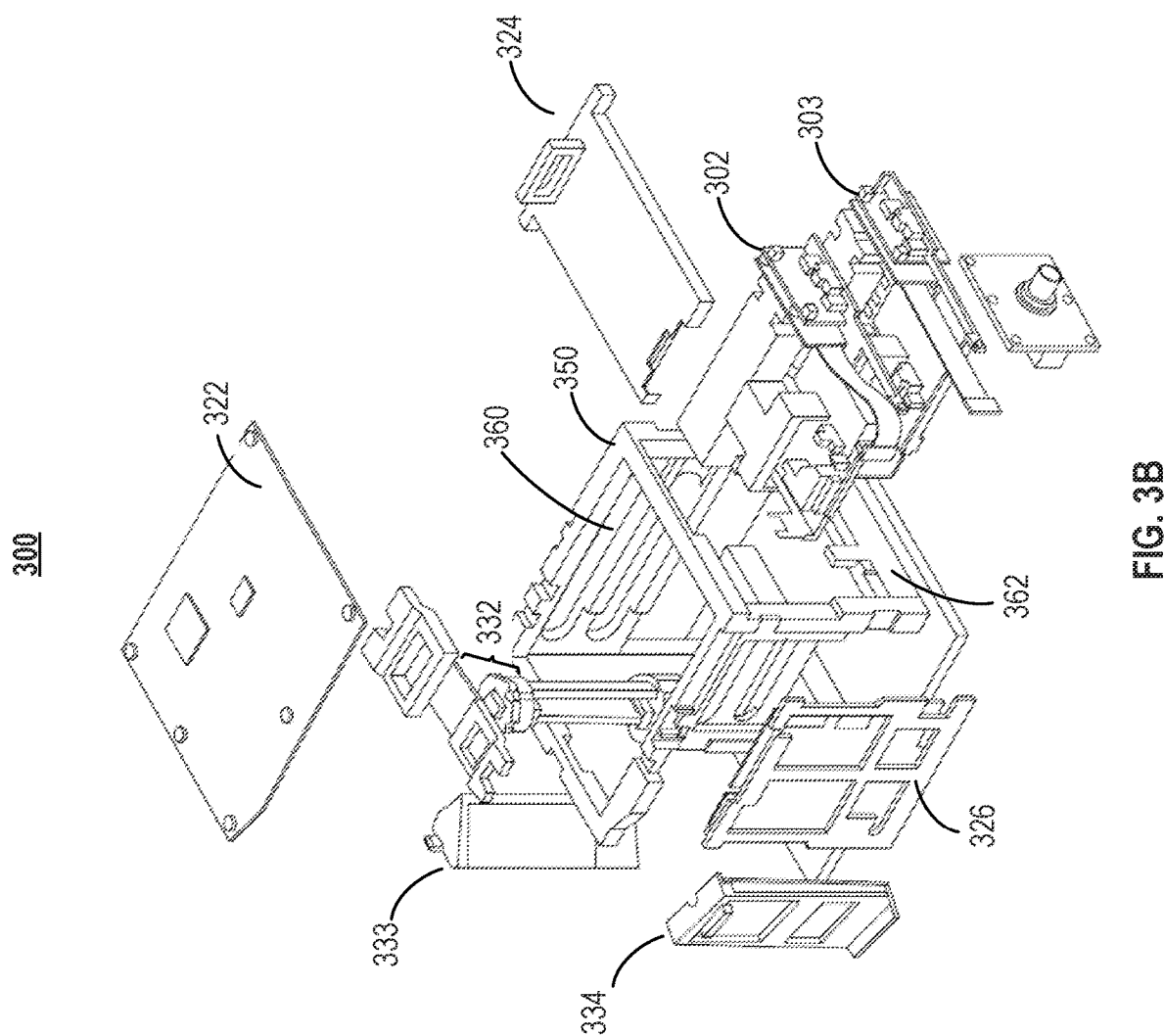

FIG. 3A illustrates an exemplary top front perspective view of a LiDAR assembly 300 and FIG. 3B illustrates an exemplary exploded view of LiDAR assembly 300 according to embodiments of the present disclosure. As described above, LiDAR assembly 300 may include an integrated transmitter-receiver module 302, a mechanical scanning module 332, a MEMS scanning module 334, a control module 322, a power module 324, and an interface module 326, respectively mounted on a one-piece frame 350 at predetermined positions of LiDAR assembly 300. In some embodiments, to provide quick assembly and removal of certain modules (e.g., modules that may need frequent maintenance and/or upgrades such as integrated transmitter-receiver module 302 and/or power module 324), LiDAR assembly 300 may also include pairs of guideways (e.g., a first pair of guideway 360 and a second pair of guideway 362) for allowing the corresponding module to slide in and out the assembly. In some embodiments, to have a larger FOV (e.g., a larger angle of scan), LiDAR assembly 300 may further include a second integrated transmitter-receiver module 303 having a similar or same structure and affixing mechanism with integrated transmitter-receiver module 302 (described in detail below) and will not be repeated for ease of illustration. In some embodiments, second integrated transmitter-receiver module 303 may be disposed beneath integrated transmitter-receiver module 302 such that modules 302 and 303 collectively cover the scanning angle of the FOV.

Figure 4:
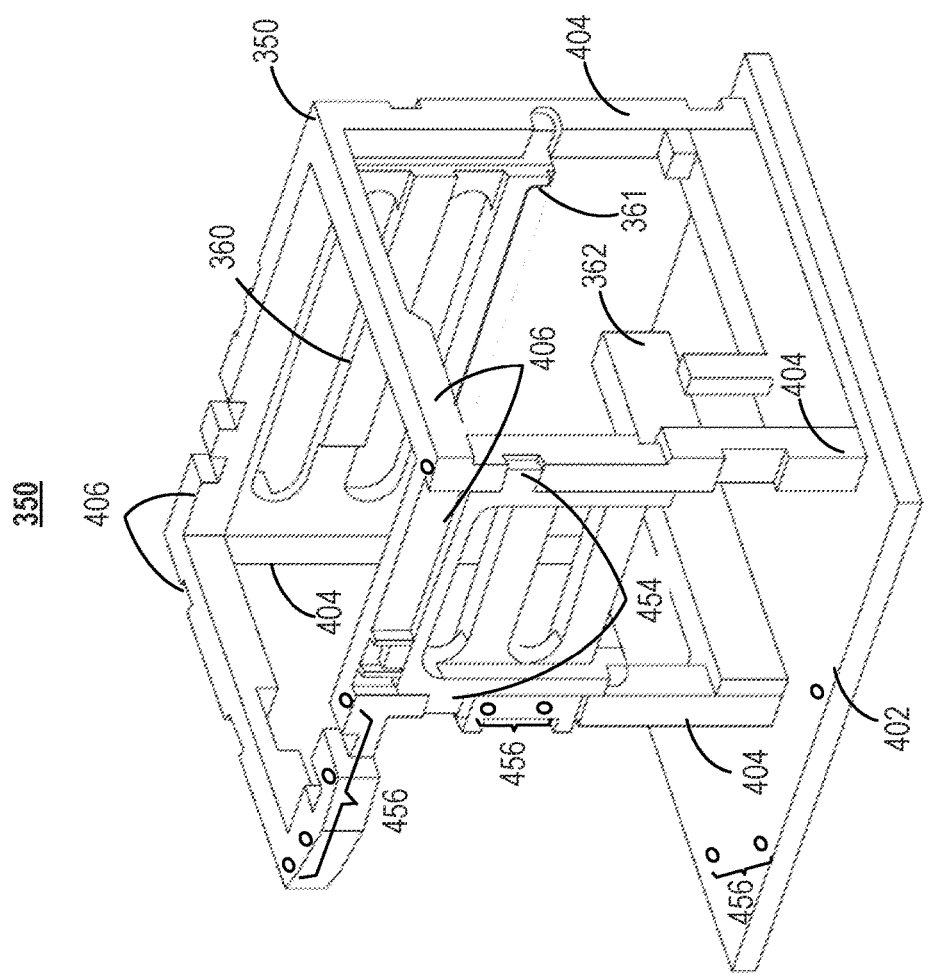
FIG. 4 illustrates an exemplary one-piece frame of the LiDAR assembly shown in FIGS. 3A and 3B, according to embodiments of the present disclosure.

In some embodiments, as illustrated in FIG. 4, one-piece frame 350 may be a chassis frame including a base 402 (e.g., a base plate) at a bottom face of one-piece frame 350, a plurality of vertical beams 404 (e.g., 4 vertical beams) supported by base 402, and a plurality of horizontal beams 406 supported by vertical beams 404. In some embodiments, vertical beams 404 and horizontal beams 406 collectively form a plurality of openings on a top face opposite base 402 and at least one lateral face of one-piece frame 350. The plurality of openings can facilitate quick assembly of LiDAR assembly 300 and may provide easy access to a target module without interference with other modules of LiDAR assembly 300.

In some embodiments, one-piece frame 350 may include positioning mechanisms such as pairs of guideways (e.g., first pair of guideways 360 and second pair of guideways 362) positioned by a plurality of positioning tabs 454 and fastener holes 456 for fastening the modules. For example, positioning tabs 454 may be disposed on vertical beams 404 and/or horizontal beams 406 for affixing/positioning first pair of guideways 360 and second pair of guideways 362. The pairs of guideways may include lock point(s) 361 for positioning the corresponding module (e.g., integrated transmitter-receiver module 302 and/or power module 324) that slides on the guideways. One-piece frame 350 may also include fastener holes 456 disposed on base 402, vertical beams 404, and horizontal beams 406 for fastening the modules such as control module 322, power module 324, interface module 326, mechanical scanning module 332, and MEMS scanning module 334. It is contemplated that the number and the position of the positioning tabs, the locking points, and the fastener holes on one-piece frame 350 shown in FIG. 4 are not exhaustive and are examples for explanatory only. More or less or different positions of the positioning tabs, the locking points, and/or the fastener holes may be used for affixing and/or positioning the above-mentioned modules.

In some embodiments, one-piece frame 350 may be made from a single piece of material (e.g., metal) without mechanical connections therebetween. For example, one-piece frame 350 including base 402, vertical beams 404, and horizontal beams 406 may be formed integrally by cutting a piece of metal (e.g., aluminum or aluminum alloy) using high grade machine tools (e.g., cutting portions of the single piece of metal away to form the openings). In some other embodiments, one-piece frame 350 may be formed integrally using a metal casting process (e.g., die casting) where molten metal (e.g., aluminum or aluminum alloy) is forced under high pressure into a mould cavity having the shape of one-piece frame 350. In some embodiments, the shape of one-piece frame 350 is custom designed according to the predetermined positions of the individual modules in LiDAR assembly 300. For example, the positioning mechanisms (e.g., the positions of positioning tabs 454 for positioning corresponding guideways and the positions of fastener holes 456 on one-piece frame 350) may be determined based on the predetermined positions of the corresponding modules they affix.

Figure 5:
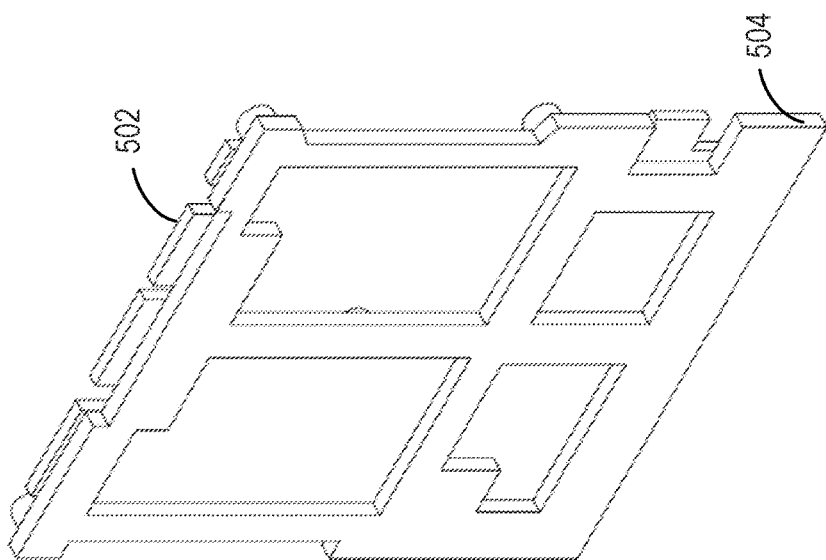
FIG. 5 illustrates an exemplary interface module of the LiDAR assembly shown in FIGS. 3A and 3B, according to embodiments of the present disclosure.

Referring back to FIGS. 3A and 3B, in some embodiments, interface module 326 may be assembled outside a lateral face of one-piece frame 350 and may be affixed to one-piece frame 350 through fasteners (not shown) screwed into one or more fastener holes 456 (shown in FIG. 4). For example, as illustrated in FIG. 5, interface module 326 may include interface circuits integrated on a PCB 502. PCB 502 may be affixed to a bracket 504 configured to provide support, mounting, and protection. For example, interface module 326 may be affixed to one-piece frame 350 through bracket 504, e.g., interface module 326 may be affixed to one-piece frame 350 by screwing both ends of bracket 504 (e.g., a top end and a bottom end, opposite to the top end) to one of horizontal beams 406 and base 402 of one-piece frame 350 respectively by screwing fasteners (not shown) into one or more fastener holes 456 on horizontal beams 406 and base 402.

In some embodiments, each of PCB 502 and PCBs 702 and 1002 (will be described below) may be a board that has one or more etched sheet layers (e.g., layers with etched conductive tracks, pads, and/or other suitable conductive features) disposed on a non-conductive substrate. Electrical components such as the interface circuits may be disposed on an etched sheet layer and may be mechanically supported and electrically connected by the etched sheet layer. In some embodiments, bracket 504 may be a metal bracket, a plastic bracket, or any suitable type of bracket capable of providing stability of the structure and ensure appropriate electrical insulation. As will be described in detail along with the assembling process for LiDAR assembly 300 below, when assembling LiDAR assembly 300, interface module 326 may be assembled to one-piece frame 350 before any of the other modules being affixed to LiDAR assembly 300.

Figure 6:
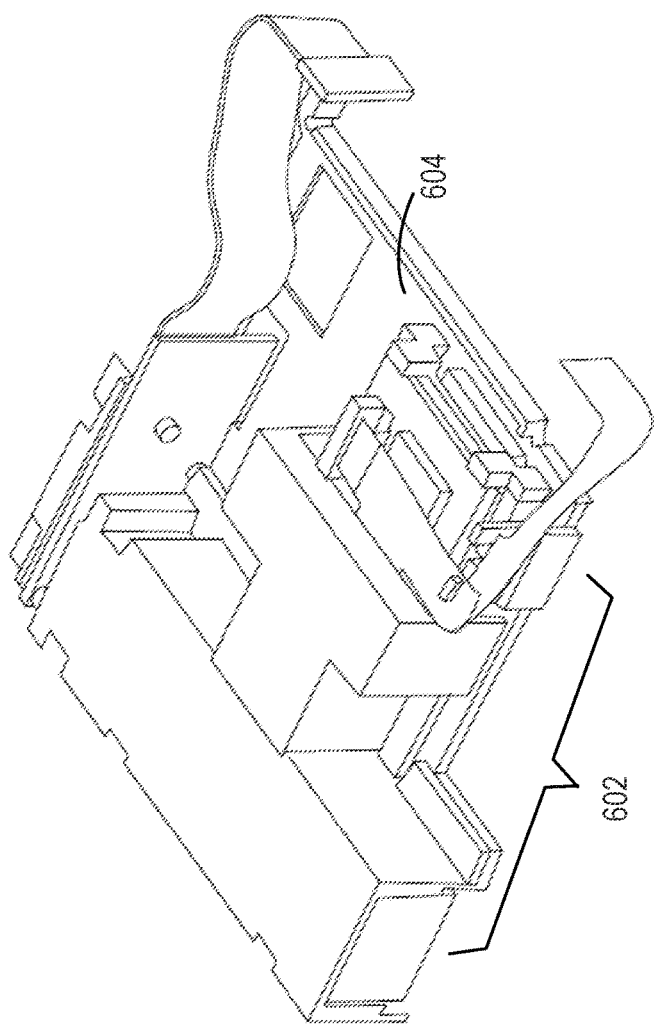
FIG. 6 illustrates an exemplary integrated transmitter-receiver module of the LiDAR assembly shown in FIGS. 3A and 3B, according to embodiments of the present disclosure.
Figure 7:
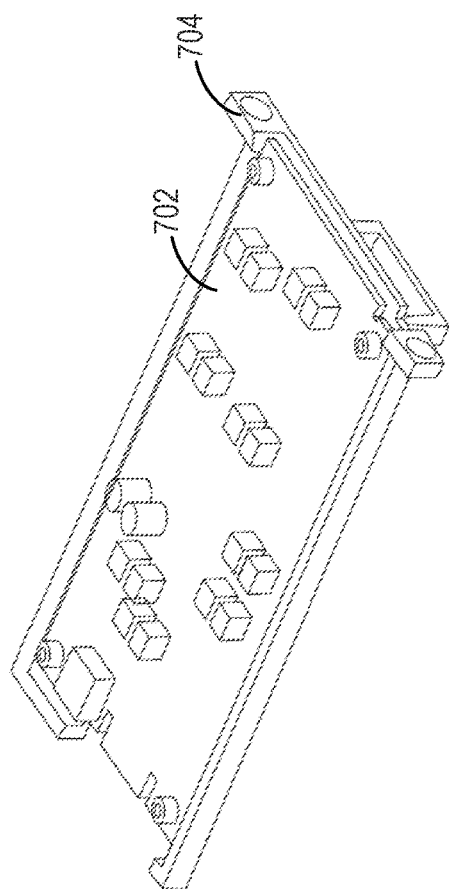
FIG. 7 illustrates an exemplary power module of the LiDAR assembly shown in FIGS. 3A and 3B, according to embodiments of the present disclosure.
Figure 8:
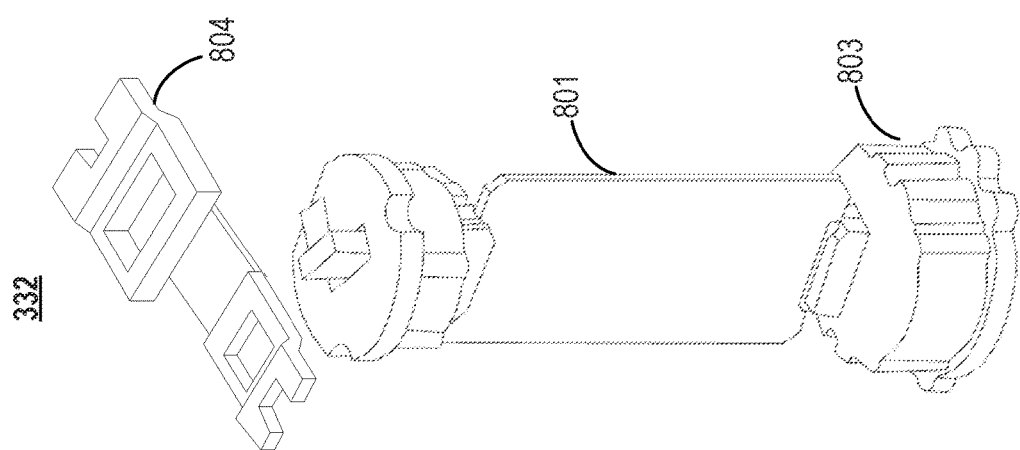
FIG. 8 illustrates an exemplary a mechanical scanning module of the LiDAR assembly shown in FIGS. 3A and 3B, according to embodiments of the present disclosure.
Figure 9:
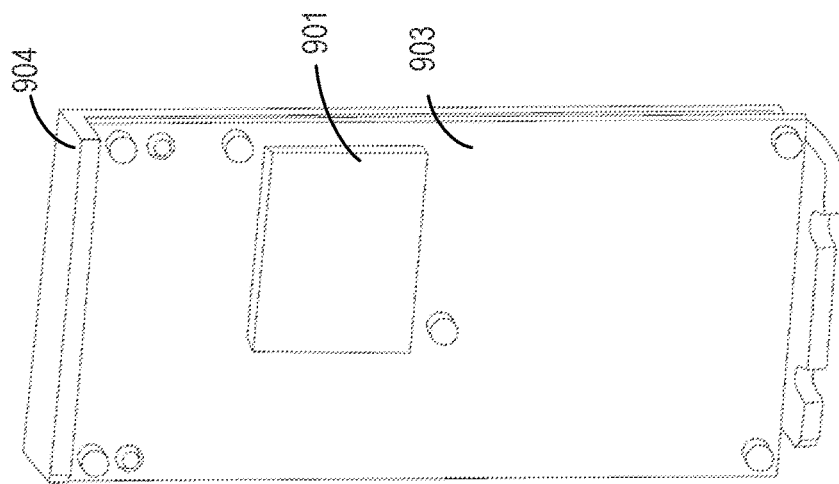
FIG. 9 illustrates an exemplary MEMS scanning module of the LiDAR assembly shown in FIGS. 3A and 3B, according to embodiments of the present disclosure.

Referring back to FIGS. 3A and 3B, in some embodiments, integrated transmitter-receiver module 302, power module 324, mechanical scanning module 332, and MEMS scanning module 334 may respectively be assembled to LiDAR assembly 300 through one-piece frame 350. For example, as illustrated in FIG. 6, functioning components 602 of integrated transmitter-receiver module 302 (e.g., transmitter 204 and receiver 206 shown in FIG. 2) may be integrated on a same base (e.g., affixed to bracket 604) configured to provide support, mounting, and protection to functioning components 602. For example, integrated transmitter-receiver module 302 may be affixed to one-piece frame 350 through bracket 604, e.g., bracket 604 may slide into one-piece frame 350 through first pair of guideways 360 shown in FIG. 4 and may be positioned by lock points 361 on first pair of guideways 360. In some embodiments, after being positioned, bracket 604 may further be affixed to first pair of guideways 360 by being screwed to first pair of guideways 360 through fasteners (not shown) screwed into one or more fastener holes 456. In some embodiments, functioning components 602 may be pre-aligned (e.g., tuning reflectors/receiving lens to focus the returned laser beams onto detectors of receiver 206) before being integrated on the base. Similar to bracket 504, bracket 604 may be a metal bracket, a plastic bracket, or any suitable type of bracket capable of providing stability of the structure and ensure appropriate electrical insulation.

In some embodiments, power module 324 may include power supply circuits for providing electrical power, integrated on a PCB 702 affixed to a bracket 704. Bracket 704 may be configured to provide support, mounting, and protection. For example, power module 324 may be affixed to one-piece frame 350 through bracket 704, e.g., bracket 704 may slide into one-piece frame 350 through second pair of guideways 362 disposed on base 402 of one-piece frame 350 as shown in FIG. 3B and may be positioned by lock points 361 on second pair of guideways 362. In some embodiments, power module 324 may be disposed towards the bottom of one-piece frame 350, e.g., near or on base 402 of one-piece frame 350, beneath integrated transmitter-receiver module 302. In some embodiments, after being positioned, bracket 704 may further be affixed to second pair of guideways 362 by being screwed to second pair of guideways 362 through fasteners (not shown) screwed into one or more fastener holes 456. Similar to bracket 504 and bracket 604, bracket 704 may be a metal bracket, a plastic bracket, or any suitable type of bracket capable of providing stability of the structure and ensure appropriate electrical insulation.

In some embodiments, mechanical scanning module 332 may include a rotatable mirror 801, a mechanical device 803 for rotating/driving rotatable mirror 801 to an angle in a first dimension of the FOV, and a bracket 804 for providing support, mounting, and protection to rotatable mirror 801 and mechanical device 803. In some embodiments, depending on the specific layout of LiDAR assembly 300, mechanical scanning module 332 may further include a reflective mirror 333 shown in FIG. 3B for directing laser beams emitted from integrated transmitter-receiver module 302 to rotatable mirror 801 and for directing returned laser beams reflected by rotatable mirror 801 to integrated transmitter-receiver module 302. In some embodiments, mechanical scanning module 332 may be affixed to one-piece frame 350 by screwing bracket 804 to horizontal beams 406 and by screwing a base of mechanical device 803 to base 402 of one-piece frame 350 respectively through fasteners (not shown) screwed into one or more fastener holes 456 on horizontal beams 406 and base 402. In some embodiments, bracket 804 may be a metal bracket, a plastic bracket, or any suitable type of bracket capable of providing stability of the structure and ensure appropriate electrical insulation.

In some embodiments, MEMS scanning module 334 may include a rotatable mirror/mirror array 901, a MEMS device 903 for rotating/driving rotatable mirror/mirror array 901 to an angle in a second dimension of the FOV, orthogonal to the first dimension, and a bracket 904 for providing support, mounting, and protection to rotatable mirror/mirror array 901 and MEMS device 903. In some embodiments, MEMS scanning module 334 may be affixed to one-piece frame 350 by screwing both ends of bracket 904 (e.g., a top end and a bottom end, opposite to the top end) to one of horizontal beams 406 and base 402 of one-piece frame 350 respectively through fasteners (not shown) screwed into one or more fastener holes 456 on horizontal beams 406 and base 402. In some embodiments, bracket 904 may be a metal bracket, a plastic bracket, or any suitable type of bracket capable of providing stability of the structure and ensure appropriate electrical insulation.

Figure 10:
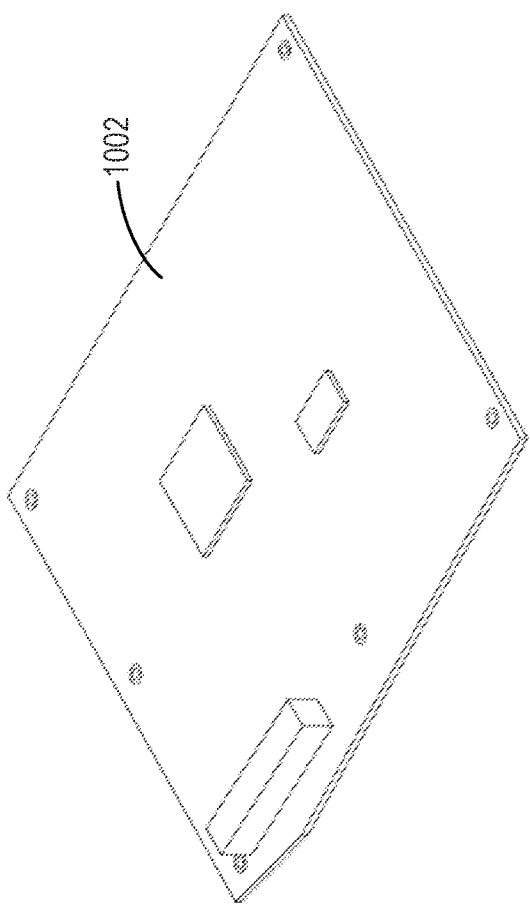
FIG. 10 illustrates an exemplary control module of the LiDAR assembly shown in FIGS. 3A and 3B, according to embodiments of the present disclosure.

Referring back to FIGS. 3A and 3B, in some embodiments, control module 322 may be assembled to the top face of one-piece frame 350 after all the above-mentioned modules are assembled/mounted, parallel to integrated transmitter-receiver module 302. In some embodiments, control module 322 may be affixed to one-piece frame 350 through fasteners (not shown) screwed into one or more fastener holes 456 on horizontal beams 406. For example, as illustrated in FIG. 10, control module 322 may include processing circuits (e.g., an ASIC or a FPGA) integrated on a PCB 1002. PCB 1002 may be configured to provide support, mounting, and protection to the processing circuits. For example, interface module 326 may be affixed to one-piece frame 350 through PCB 1002, e.g., control module 322 may be affixed to one-piece frame 350 by screwing one or more sides of PCB 1002 to at least one of horizontal beams 406 respectively through fasteners (not shown) screwed into one or more fastener holes 456 on horizontal beams 406. As will be described in detail along with the assembling process for LiDAR assembly 300 below, when assembling LiDAR assembly 300, control module 322 may be assembled to one-piece frame 350 after all the other modules being affixed to LiDAR assembly 300.

Figure 11A:
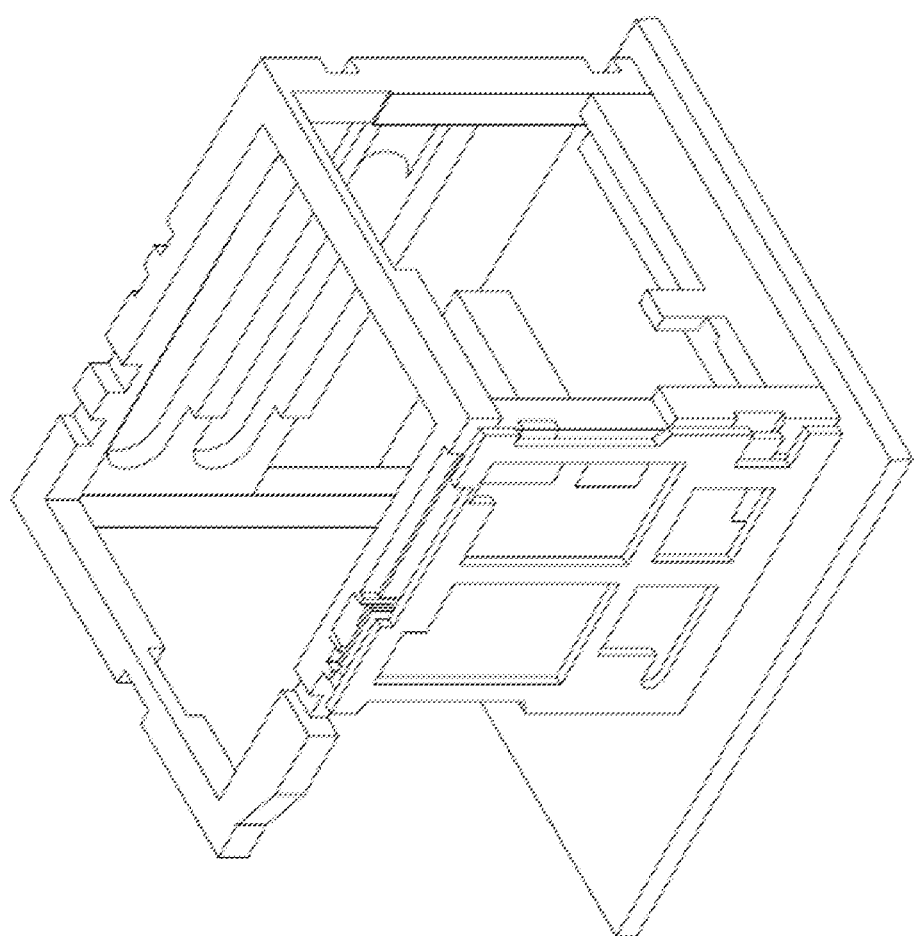
FIGS. 11A-11C illustrate an exemplary assembling process for assembling a LiDAR assembly with modularized components, according to embodiments of the present disclosure.
Figure 11B:
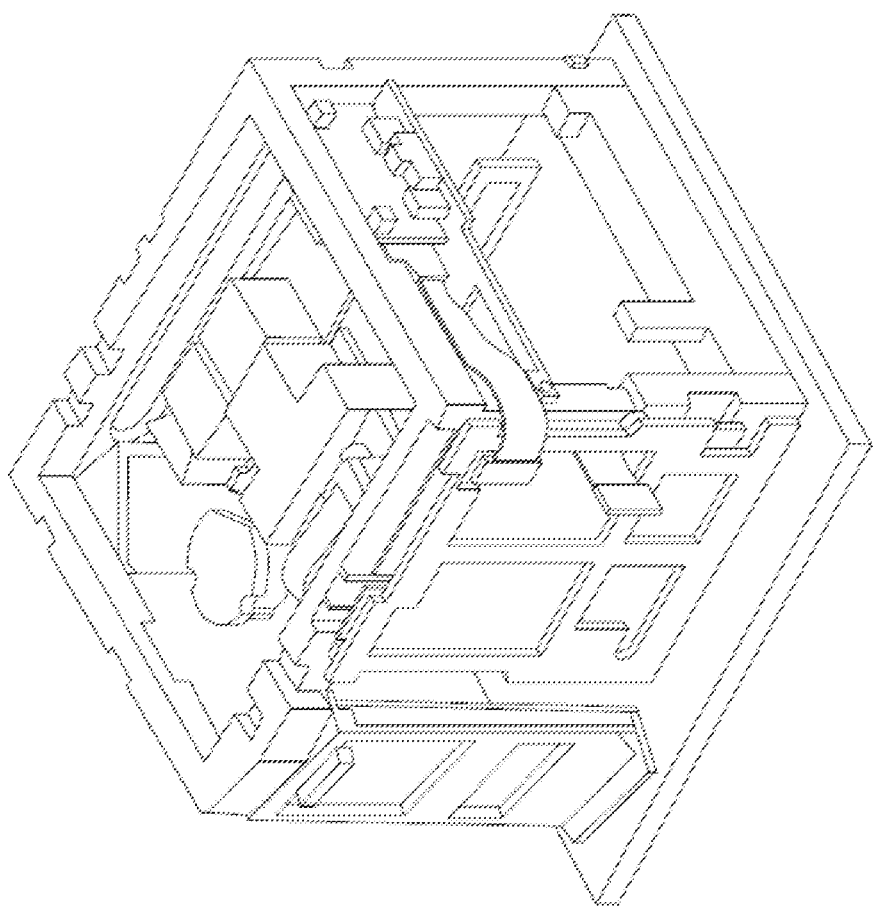
Figure 11C:
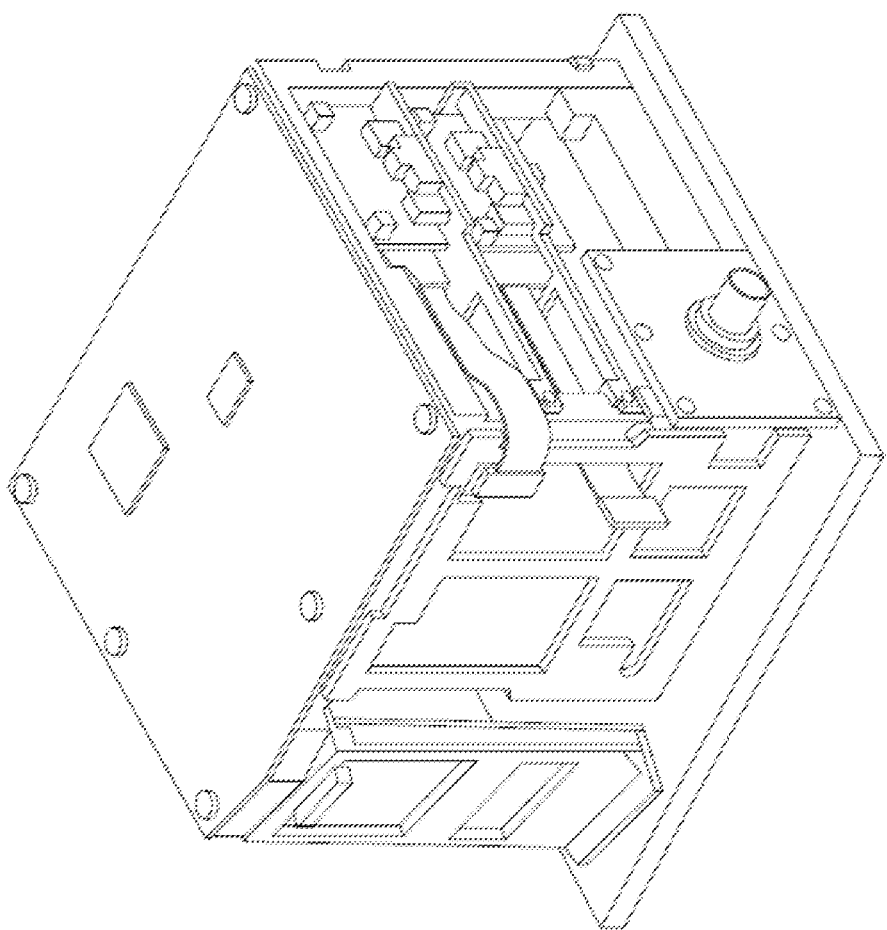
Figure 12:
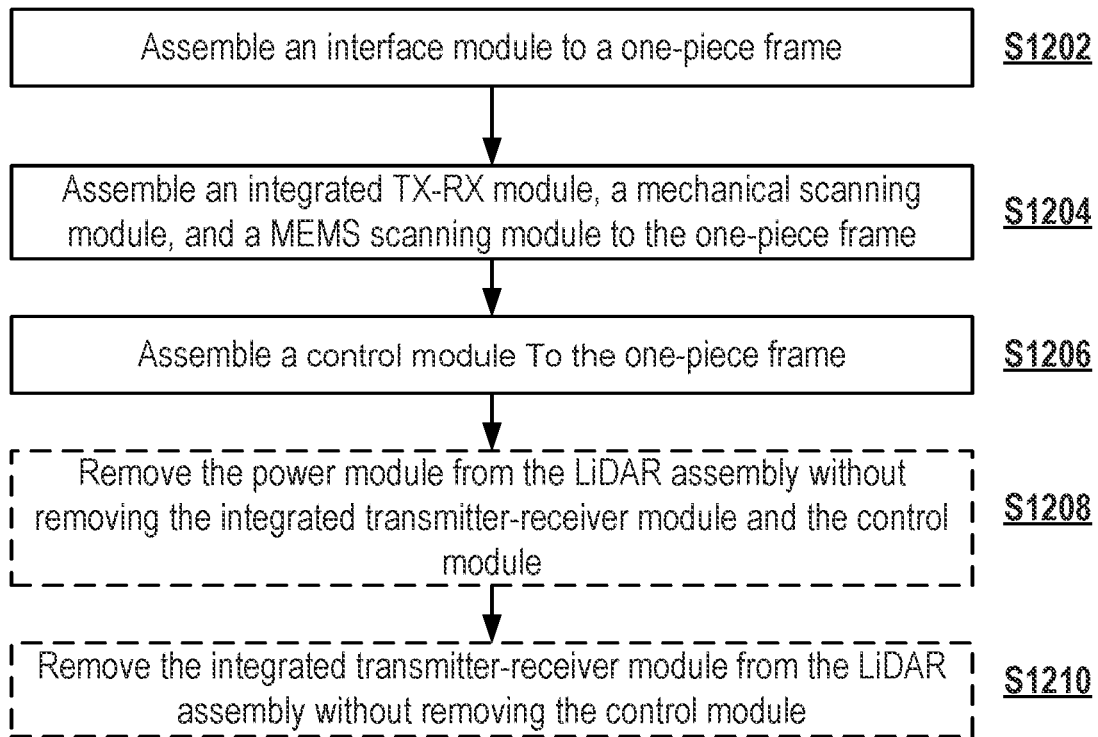
FIG. 12 shows a flowchart of an exemplary method for assembling a LiDAR assembly with modularized components, according to embodiments of the present disclosure.

FIG. 12 shows a flow chart of an exemplary method for assembling a LiDAR assembly with modularized components, according to embodiments of the present disclosure. In some embodiments, method 1200 may be performed for assembling LiDAR assemblies 102 and 300. In some embodiments, method 1200 may include steps S1202-S1210. It is to be appreciated that some of the steps may be optional. Further, some of the steps may be performed simultaneously, or in a different order than that shown in FIG. 12. FIGS. 11A-11C illustrate intermediate structures of the LiDAR assembly during the assembling process.

In step S1202, an interface module (e.g., interface module 326) may be assembled outside a lateral face of a one-piece frame (e.g., one-piece frame 350) and may be affixed to the one-piece frame through fasteners (not shown) screwed into fastener holes on the one-piece frame. In some embodiments, as shown in FIG. 11A, the one-piece frame may include a plurality of horizontal beams supported by a plurality of vertical beams supported by a base. The horizontal beams and the vertical beams collectively form a plurality of openings on a top face opposite the base and at least one lateral face. For example, the interface circuits integrated on the interface module may be integrated on a PCB (e.g., PCB 502) affixed to a bracket (e.g., bracket 504). The interface module may be affixed to the one-piece frame by screwing both ends of the bracket (e.g., a top end and a bottom end, opposite to the top end) to one of the horizontal beams and the base of the one-piece frame respectively through fasteners (not shown) screwed into the fastener holes on the horizontal beams and the base.

In step S1204, an integrated transmitter-receiver module (e.g., integrated transmitter-receiver module 302), a power module (e.g., power module 324), a mechanical scanning module (e.g., mechanical scanning module 332), and a MEMS scanning module (e.g., MEMS scanning module 334) may respectively be assembled to the one-piece frame at predetermined positions. In some embodiments, as shown in FIG. 11B, the integrated transmitter-receiver module, the power module, the mechanical scanning module, and the MEMS scanning module may be sequentially assembled to the one-piece frame using the positioning mechanisms described above respectively. It is contemplated that the sequence for assembling the integrated transmitter-receiver module, the power module, the mechanical scanning module, and the MEMS scanning module is not limited to what is disclosed herein. Any suitable sequence may be applied for assembling those modules. Because the modules can be assembled and accessed independent from one another, the exact order of assembling these modules is entirely flexible.

In some embodiments, after being mounted to the one-piece frame, the integrated transmitter-receiver module may be connected to the interface module by the ribbon cable and the rigid flex cable. For example, the transmitter of the integrated transmitter-receiver module may be connected to the interface module by the ribbon cable and the receiver of the integrated transmitter-receiver module may be connected to the interface module by the rigid flex cable. In some embodiments, the power module may be connected to the interface module by golden fingers.

In step S1206, a control module (e.g., control module 322) may be assembled to the top face of the one-piece frame after all the above-mentioned modules are assembled/mounted. In some embodiments, as shown in FIG. 11C, the control module may be affixed to the one-piece frame through fasteners (not shown) screwed into the fastener holes on the horizontal beams on the top surface of the one-piece frame.

After being mounted to the one-piece frame, the control module may be connected to the interface module by golden fingers for transmitting control signals and receiving electrical power. The MEMS scanning module may be connected to the control module by ribbon cables for receiving control signals (e.g., for controlling the rotation of the rotatable mirror/mirror array of the MEMS scanning module).

It is contemplated that the connections between the above-mentioned modules are for illustrative only. Any suitable connecting methods may be implemented for connecting modules in the LiDAR assembly.

In some embodiments, method 1200 may further include steps S1208 and S1210 for module maintenance and repair purpose. In step S1208, the power module may be removed from the LiDAR assembly without removing the integrated transmitter-receiver module and the control module. For example, as described above, the power module may be removed from the LiDAR assemble through the corresponding guideway (e.g., second guideway 362) from a lateral face of the one-piece frame (e.g., having an opening on the face) without impacting the integrated transmitter-receiver module and the control module.

In step S1210, the integrated transmitter-receiver module may be removed from the LiDAR assembly without removing the control module. For example, as described above, the integrated transmitter-receiver module may be removed from the LiDAR assemble through the corresponding guideway (e.g., first guideway 360) from a lateral face of the one-piece frame (e.g., having an opening on the face) without interfering the control module.

FIG. 13 shows a flow chart of an exemplary optical sensing method performed by a LiDAR system with modularized components, according to embodiments of the present disclosure. In some embodiments, method 1300 may be performed by LiDAR assemblies 102 or 300. In some embodiments, method 1300 may include steps S1302-S1306. It is to be appreciated that some of the steps may be optional. Further, some of the steps may be performed simultaneously, or in a different order than that shown in FIG. 13.

In step S1302, optical signals are emitted by an integrated transmitter-receiver module (e.g., integrated transmitter-receiver module 302) to an environment surrounding the LiDAR assembly (e.g., LiDAR assemblies 102 or 300). As described above, the integrated transmitter-receiver module may be assembled on a first bracket (e.g., bracket 604) before being positioned to the LiDAR assembly. In some embodiments, the integrated transmitter-receiver module may include a transmitter configured to emit laser beams for scanning the environment.

In step S1304, the emitted optical signals are scanned by a scanner (e.g., scanner 230) for scanning a FOV. In some embodiments, the scanner may include a mechanical scanning module (e.g., mechanical scanning module 332) for scanning a first dimension of the FOV and a MEMS scanning module (e.g., MEMS scanning module 334) for scanning a second dimension, orthogonal to the first dimension. In some embodiments, the mechanical scanning module and the MEMS scanning module are affixed to different brackets before being assembled to the LiDAR system.

In step S1306, optical signals returned from the environment (e.g., reflected by an object) are detected by the integrated transmitter-receiver module. As described above, the integrated transmitter-receiver module may further include a receiver configured to detect the returned laser beams. For example, the returned laser beams may be received by the scanner which directs the returned laser beams to the receiver of the integrated transmitter-receiver module.

In some embodiments, in steps S1302-S1306, the integrated transmitter-receiver module and the scanner are controlled by a control module (e.g., control module 322) for emitting, scanning, and detecting the laser beams. For example, the control module may drive the MEMS scanning module to a first angle in a first dimension and drive the mechanical scanning module to a second angle in a second dimension, orthogonal to the first dimension as described above. In some embodiments, the control module is affixed on a PCB board and the integrated transmitter-receiver module is operatively coupled to the control module through an interface module (e.g., interface module 326). The interface module may be affixed to a bracket (e.g., bracket 504) before being positioned to the LiDAR assembly.

In some embodiments, as described above, integrated transmitter-receiver module, the scanner, the control module, and the interface module are positioned to a one-piece frame (e.g., 350) at predetermined positions of the LiDAR assembly through the corresponding brackets and the PCB respectively.

Figure 14:
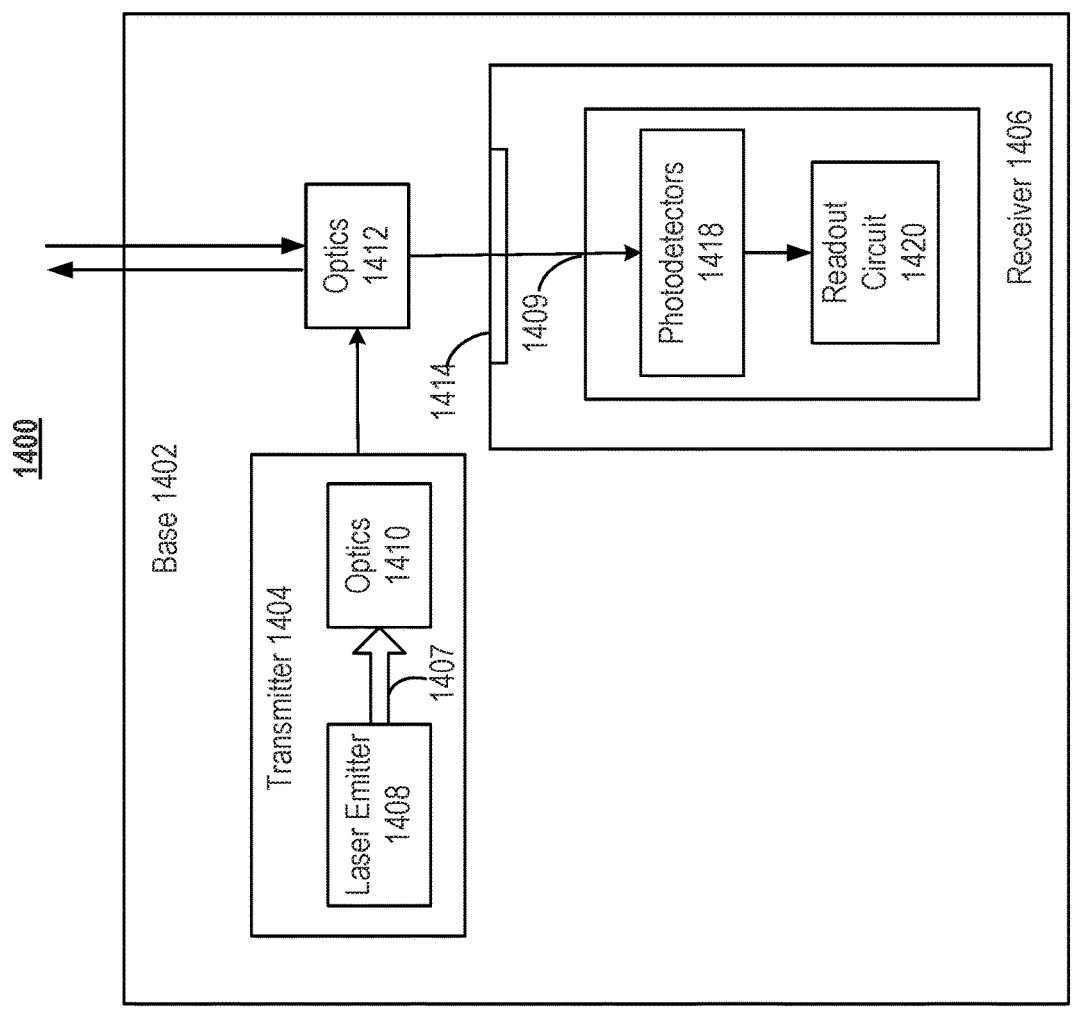
FIG. 14 illustrates a block diagram of an exemplary integrated transmitter-receiver module compatible with the LiDAR assembly shown in FIGS. 3A and 3B, according to embodiments of the present disclosure.

FIG. 14 illustrates a block diagram of an exemplary integrated transmitter-receiver module 1400 compatible with LiDAR assembly 300, according to embodiments of the present disclosure. In some embodiments, integrated transmitter-receiver module 1400 may be integrated transmitter-receiver module 202 in FIG. 2 or integrated transmitter-receiver module 302 in FIGS. 3A and 3B.

As illustrated, integrated transmitter-receiver module 1400 may include a transmitter 1404 and a receiver 1406 integrated into a single package. For example, transmitter 1404 and receiver 1406 may be integrated on a shared base 1402 (e.g., a bracket for support and mounting). In some embodiments, transmitter 1404 may be disposed on base 1402 towards a first direction and receiver 1406 may be disposed on base 1402 towards a second direction, orthogonal to the first direction. In some embodiments, integrated transmitter-receiver module 1400 may also include optics 1412 for converging/focusing and changing the propagation direction of the optical signals (e.g., change the propagation direction of the emitted optical signal to be substantially parallel with the propagation direction of the returned optical signal).

In some embodiments, each of transmitter 1404 and receiver 1406 may further include its specific components. For instance, transmitter 1404 may further include a laser emitter 1408 for emitting optical signals 1407 and optics 1410 for shaping optical signals 1407. For another instance, receiver 1406 may include receiving lens 1414 for collecting returned optical signals 1409 from a scanner (e.g., scanner 230 in FIG. 2) and detectors (e.g., photodetectors 1418) for detecting returned optical signal 1409 collected by receiving lens 1414. Receiver 1406 may further include a readout circuit 1420 for converting the detected signal to an electrical signal for further processing, e.g., by a control module (e.g., control module 222 in FIG. 2) of the LiDAR assembly.

As described above, transmitter 1404 may emit optical signals 1407 (e.g., pulsed laser beams, continuous wave (CW) beams, frequency modulated continuous wave (FMCW) beams) towards the first direction. Transmitter 1404 may include one or more laser sources (e.g., laser emitters 1408) and one or more optics 1410. According to one example, laser emitter 1408 may sequentially emit optical signals 1407 (e.g., a stream of laser beams) to optics 1410 which would focus optical signals 1407 to optics 1412 at a predetermined direction.

In some embodiments, optics 1412 may receive optical signals 1407 and may change the propagation direction of optical signals 1407 (e.g., to be substantially parallel to returned optical signal 1409). For example, optics 1412 may be designed such that optical signals 1407 may be reflected for substantially 90-degree and returned optical signals 1409 may be transmitted through and be focused on receiver 1406.

Receiver 1406 may be configured to detect returned optical signals 1409. Upon receiving returned optical signals 1409, receiver 1406 may output electrical signals reflecting the intensity of returned optical signals 1409.

In some embodiments, receiver 1406 may include lens 1414, photodetectors 1418, and readout circuit 1420. For example, lens 1414 may be configured to receive returned optical signals 1409 in a respective direction and converge returned optical signals 1409 to focus on photodetectors 1418. Photodetectors 1418 may be configured to detect returned optical signals 1409 converged by lens 1414. In some embodiments, photodetectors 1418 may convert the laser light (e.g., returned optical signals 1409) into electrical signals (e.g., currents or voltage signals). Readout circuit 1420 may be configured to integrate, amplify, filter, and/or multiplex the signal detected by photodetectors 1418 and transfer the integrated, amplified, filtered, and/or multiplexed signal onto output parts (e.g., control module 222 shown in FIG. 2) for readout.

In some embodiments, before being integrated on base 1402, transmitter 1404, receiver 1406, and optics 1412 are pre-aligned. For example, transmitter 1404 and optics 1412 may be pre-adjusted such that optical signals 1407 is focused to a center of optics 1410 and is emitted at a predetermined direction towards optics 1412. As described above, the predetermined direction may be determined such that the incident angle of emitted optical signals 1407 is 90-degree different from the exiting angle of emitted optical signals 1407 after being reflected by optics 1412. Optics 1412 and receiver 1406 may also be adjusted such that returned optical signals 1409 are focused on one or more detectors of receiver 1406 (e.g., photodetectors 1418).

Figure 15:
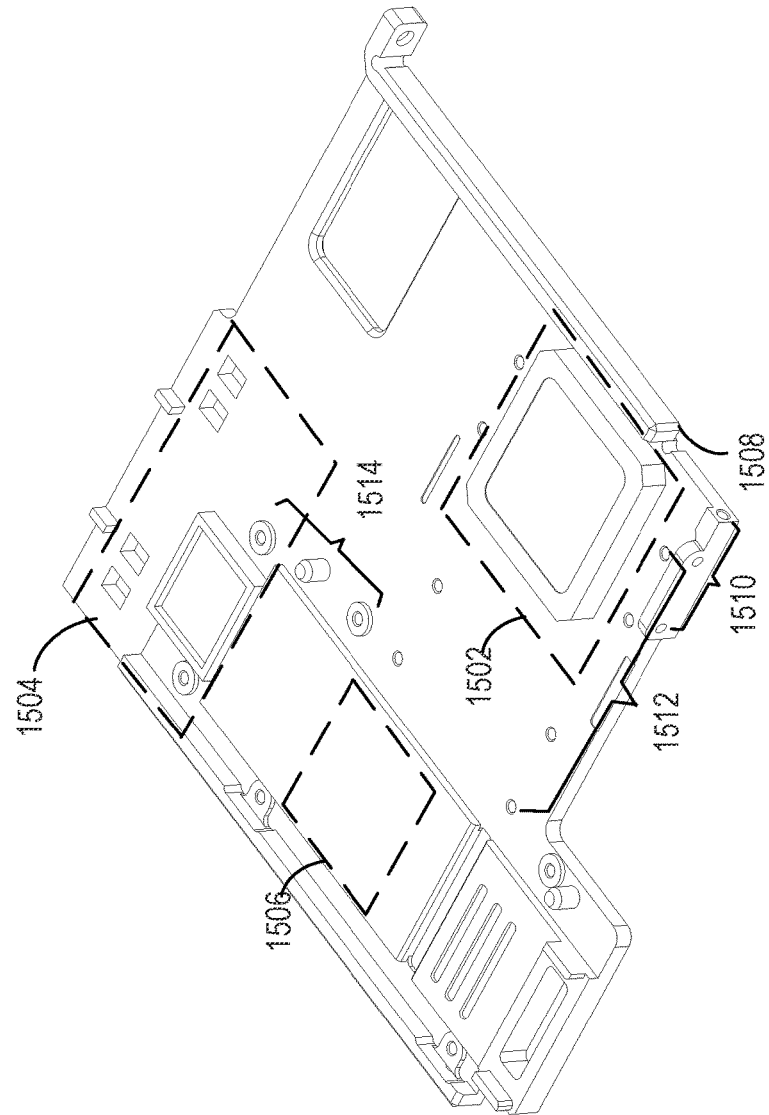
FIG. 15 illustrates an exemplary base compatible with the integrated transmitter-receiver module shown in FIG. 14, according to embodiments of the present disclosure.

FIG. 15 illustrates exemplary base 1402 of integrated transmitter-receiver module 1400, according to embodiments of the present disclosure. As illustrated, transmitter 1404, receiver 1406, and optics 1412 may be disposed on base 1402 at areas 1502, 1504, and 1506 noted with dashed-line boxes respectively. In some embodiments, transmitter 1404 and receiver 1406 may be affixed to areas 1502 and 1504 by glue. Base 1402 may include slots (not shown) where lens of optics 1412 may be inserted for fixation.

In some embodiments, integrated transmitter-receiver module 1400 is assembled to the LiDAR assembly (e.g., LiDAR assembly 300) through base 1402. For example, the side of base 1402 may engage the positioning mechanism of the LiDAR assembly, e.g., the side of base 1402 may be configured to slide on guideways of the LiDAR assembly (e.g., guideways 360 shown in FIG. 4). In some embodiments, the side of base 1402 may include stop points 1508 corresponding to the lock points of the guideways (e.g., lock points 361). In some embodiments, when integrated transmitter-receiver module 1400 reaches the predetermined position of the LiDAR assembly, stop points 1508 may engage the lock points on the guideways of the LiDAR assembly to stop integrated transmitter-receiver module 1400 from moving further. In some embodiments, base 1402 may further include a set of fastener holes 1510, corresponding to part of the fastener holes (e.g., fastener holes 456) on the frame (e.g., frame 350) of the LiDAR assembly for affixing base 1402 to the LiDAR assembly when integrated transmitter-receiver module 1400 is positioned at the predetermined position. For example, fastener holes 1510 may be screwed to corresponding fastener holes 456 using any suitable fasteners to affix integrated transmitter-receiver module 1400 to the LiDAR assembly through base 1402.

In some embodiments, base 1402 may further include sets of fastener holes 1512 and 1514, configured to affix the enclosures of transmitter 1404 and receivers 1406 respectively. For example, the enclosures may be screwed to base 1402 through fastener holes 1512 and 1514 for affixation. The enclosures may be made of any suitable materials that can protect emitted optical signals 1407 and returned optical signals 1409 from outside interferences (e.g., light from other light sources).

Figure 16:
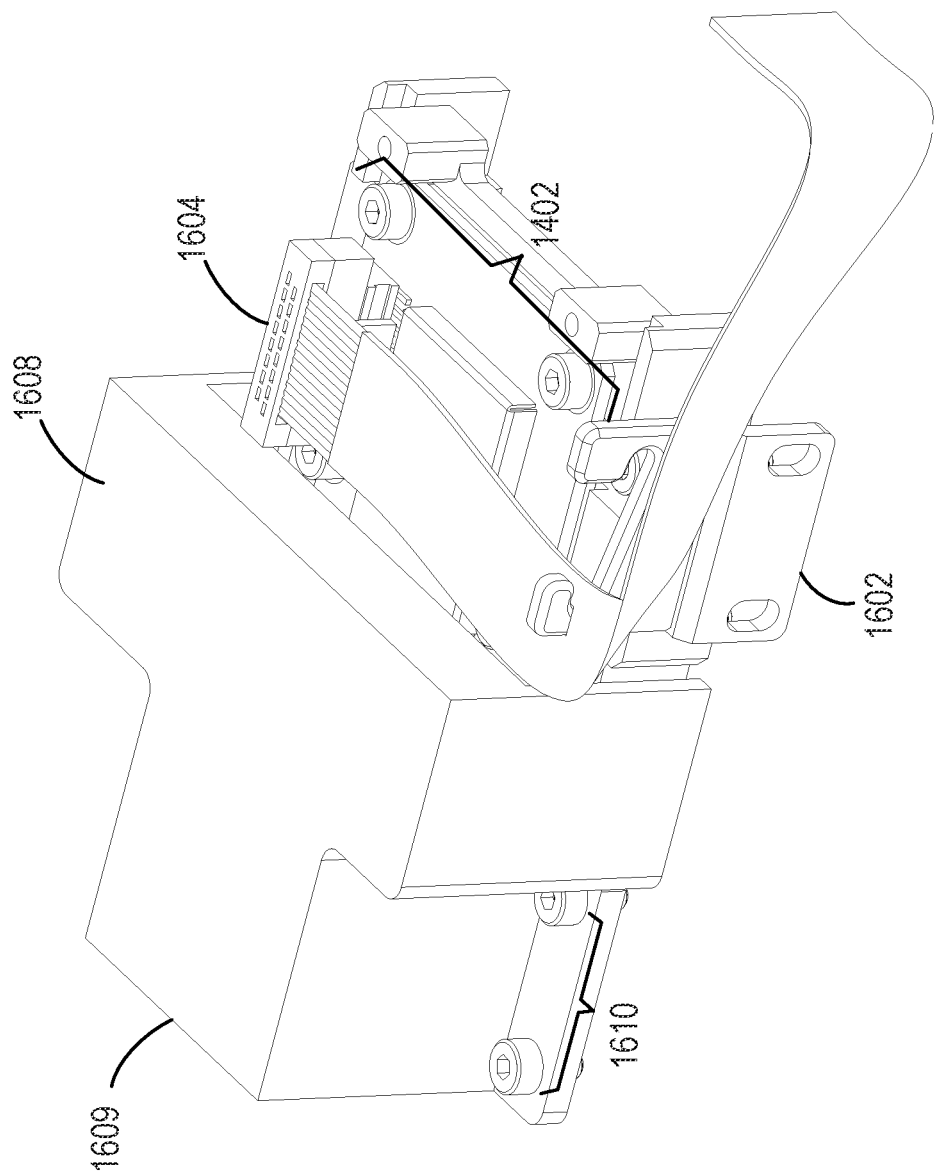
FIG. 16 illustrates an exemplary transmitter compatible with the integrated transmitter-receiver module shown in FIG. 14, according to embodiments of the present disclosure.

FIG. 16 illustrates exemplary transmitter 1404 of the integrated transmitter-receiver module 1400, according to embodiments of the present disclosure. As illustrated, transmitter 1404 may be glued to area 1502 of base 1402 through legs 1602. Transmitter 1404 may also include a connector interface 1604, configured to connect with an interface module (e.g., interface module 326 shown in FIGS. 3A and 3B) for data transmission (e.g., control signals for emitting the optical signals) and receiving electrical power. For example, connector interface 1604 may be a ribbon cable connector, connected to the interface module through ribbon cable(s).

In some embodiments, as described above, transmitter 1404 may further include an enclosure 1608 configured to protect emitted optical signals 1407 from external interferences (e.g., light from other light sources), thus increasing the signal-noise ratio (SNR) of emitted optical signals 1407. For example, the laser source (e.g., laser emitter 1408) of transmitter 1404 may be covered by enclosure 1608 and emitted optical signals 1407 may pass through a window 1609 (not explicitly shown) of enclosure 1608 to reach optics 1412.

In some embodiments, enclosure 1608 may be made of any suitable materials that can shelter external interferences as described above for emitted optical signals 1407. In some embodiments, enclosure 1608 may be affixed to transmitter 1404 through fastener holes 1610 corresponding to fastener holes 1512 on base 1402.

Figure 17:
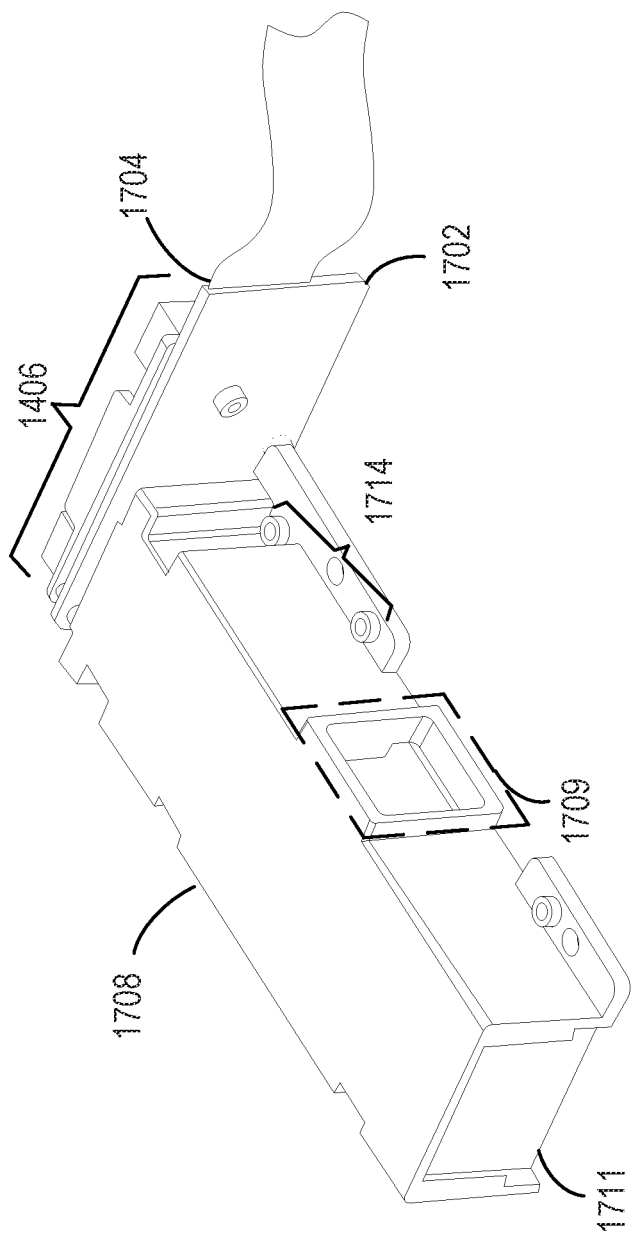
FIG. 17 illustrates an exemplary receiver compatible with the integrated transmitter-receiver module shown in FIG. 14, according to embodiments of the present disclosure.

FIG. 17 illustrates exemplary receiver 1406 of integrated transmitter-receiver module 1400, according to embodiments of the present disclosure. As illustrated, receiver 1406 may be glued to area 1504 of base 1402 through legs 1702. Receiver 1406 may also include a connector interface 1704, configured to connect with the interface module (e.g., interface module 326 shown in FIGS. 3A and 3B) for data transmission and receiving electrical power. For example, connector interface 1704 may be a rigid flex cable connector, connected to the interface module through rigid flex cable(s).

In some embodiments, as described above, receiver 1406 may further include an enclosure 1708 configured to provide sheltering to returned optical signals 1409 from external interferences, thus increasing the SNR of returned optical signals 1409. For example, returned optical signals 1409 may be received through a window 1711 of enclosure 1708 to be collected by optics 1412. In some embodiments, optics 1412 is also covered by enclosure 1708 where emitted optical signals 1407 may be received by optics 1412 through a window 1709 of enclosure 1708, connecting with window 1609 of enclosure 1608.

Similar to enclosure 1608, enclosure 1708 may be made of any suitable materials for sheltering returned optical signals 1409 and emitted optical signal 1407 from interferences. In some embodiments, enclosure 1708 may be affixed to receiver 1406 through fastener holes 1714 corresponding to fastener holes 1514 on base 1402.

Figure 18:
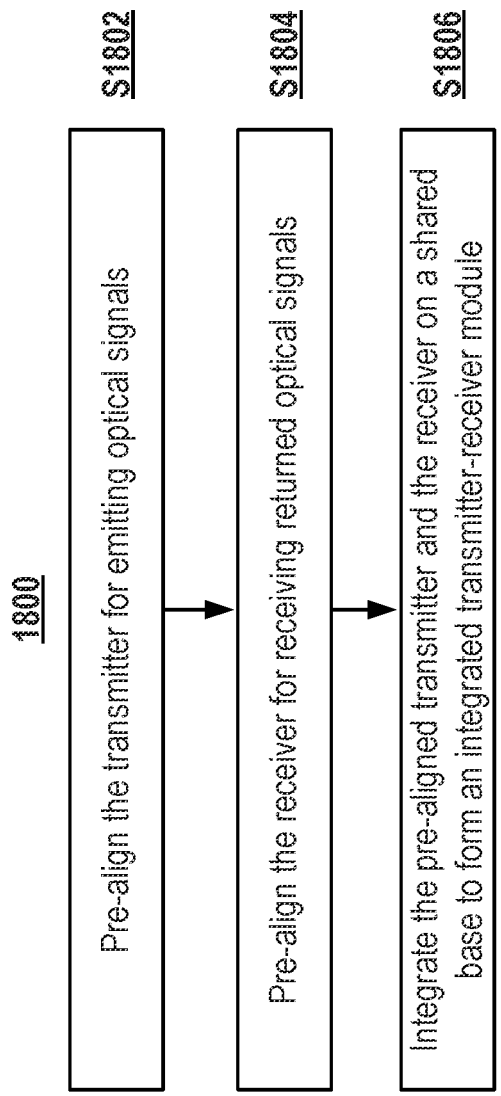
FIG. 18 shows a flow chart of an exemplary method for making an integrated transmitter-receiver module, according to embodiments of the present disclosure.

FIG. 18 shows a flow chart of an exemplary method 1800 for making integrated transmitter-receiver module 1400, according to embodiments of the present disclosure. In some embodiments, method 1800 may include steps S1802-S1806. It is to be appreciated that some of the steps may be optional. Further, some of the steps may be performed simultaneously, or in a different order than that shown in FIG. 18.

In step S1802, a transmitter (e.g., transmitter 1404) may be pre-aligned with respect to other components in the integrated transmitter-receiver module for emitting the optical signals (e.g., emitted optical signals 1407). For example, the transmitter may be pre-adjusted such that the emitted optical signals are focused to a center of the optics (e.g., optics 1412) and are emitted at a predetermined direction towards the optics.

In step S1804, a receiver (e.g., receiver 1406) may be pre-aligned with respect to other components in the integrated transmitter-receiver module for receiving the returned optical signals (e.g., returned optical signals 1409). For example, the receiver may be pre-adjusted such that the returned optical signals are focused on one or more detectors (e.g., photodetectors 1418) of the receiver.

In step S1806, the pre-aligned transmitter and receiver may be integrated on a shared base (e.g., base 1402) to form the integrated transmitter-receiver module (e.g., integrated transmitter-receiver module 1400). For example, as described above, the transmitter and the receiver may be glued to the predetermined positions on the shared base after being pre-aligned. In some embodiment, as described above, method 1800 may further include affixing enclosures covering transmitter 1404 and receiver 1406 respectively (e.g., enclosures 1608 and 1708) to the base to provide sheltering to the emitted and returned optical signals.

Figure 19:
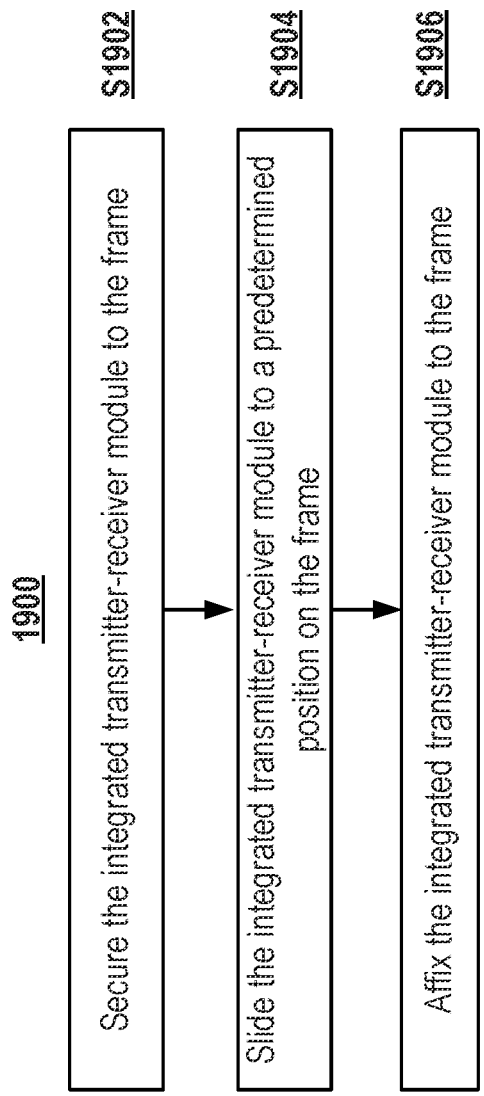
FIG. 19 shows a flow chart of an exemplary method for assembling an integrated transmitter-receiver module to a LiDAR assembly, according to embodiments of the present disclosure.

FIG. 19 shows a flow chart of an exemplary method 1900 for assembling integrated transmitter-receiver module 1400 to a LiDAR assembly, according to embodiments of the present disclosure. In some embodiments, method 1900 may include steps S1902-S1906. It is to be appreciated that some of the steps may be optional. Further, some of the steps may be performed simultaneously, or in a different order than that shown in FIG. 19.

In step S1902, the integrated transmitter-receiver module (e.g., integrated transmitter-receiver module 1400) may be secured to a positioning mechanism of the frame (e.g., frame 350) of the LiDAR assembly. For example, the side of the base (e.g., base 1402) of the integrated transmitter-receiver module may engage guideways (e.g., guideways 360) of the frame to secure the integrated transmitter-receiver module to the frame.

In step S1904, the integrated transmitter-receiver module may be slide to a predetermined position of the frame. For example, the side of the base may include stop points (e.g., stop points 1508) corresponding to the lock points of the guideways (e.g., lock points 361). In some embodiments, when the integrated transmitter-receiver module reaches the predetermined position of the frame, the stop points may engage the lock points on the guideways of the frame to stop the integrated transmitter-receiver module from moving further.

In step S1906, the integrated transmitter-receiver module may be affixed to the frame after reaching the predetermined position. For example, the base of the integrated transmitter-receiver module may further include a set of fastener holes (e.g., fastener holes 1510), corresponding to part of the fastener holes (e.g., fastener holes 456) on the frame of the LiDAR assembly for affixing the base to the frame of the LiDAR assembly when the integrated transmitter-receiver module is positioned at the predetermined position. For example, the fastener holes on the base may be screwed to corresponding fastener holes on the frame using any suitable fasteners to affix the integrated transmitter-receiver module to the frame of the LiDAR assembly through the base.

Although the disclosure is made using a LiDAR system as an example, the disclosed embodiments may be adapted and implemented to other types of optical sensing systems that use optical signals not limited to laser beams. For example, the embodiments may be readily adapted for optical imaging systems or radar detection systems that use electromagnetic waves to scan objects. Further, the disclosed embodiments may be adapted and implemented to other types of systems that include multiple function modules that are pre-positioned in the system, and the function modules may require repair or replacement after assembly. The disclosed systems and methods facilitate accurate assembly of the function modules while allowing easy access to the modules.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

The invention claimed is:

1. An integrated transmitter-receiver module for a LiDAR assembly, comprising:
    a laser emitter configured to emit optical signals to an environment surrounding the LiDAR assembly; and
    a receiver configured to detect returned optical signals from the environment, wherein the laser emitter and the receiver are pre-aligned to focus the returned optical signal on one or more detectors of the receiver and are pre-affixed on a shared base, wherein the shared base is configured to assemble the integrated transmitter-receiver module to the LiDAR assembly through a frame.

2. The integrated transmitter-receiver module of claim 1, wherein the receiver further comprises a receiving lens pre-adjusted to focus the returned optical signal on the one or more detectors.

3. The integrated transmitter-receiver module of claim 1, further comprising optics configured to shape the optical signals emitted from the laser emitter, wherein the laser emitter is pre-adjusted to:
    focus the emitted optical signal to a center of the optics such that the optical signal is emitted at a predetermined direction towards the optics.

4. The integrated transmitter-receiver module of claim 1, wherein the laser emitter further comprises a first connector interface configured to connect with an interface module of the LiDAR assembly through a ribbon cable, wherein
    the interface module is configured to operatively couple the integrated transmitter-receiver module and a control module configured to control the integrated transmitter-receiver module to emit the optical signals.

5. The integrated transmitter-receiver module of claim 4, wherein the receiver further comprises a second connector interface configured to connect the receiver with the interface module through a rigid flex cable.

6. The integrated transmitter-receiver module of claim 1, wherein the LiDAR assembly comprises the frame, wherein the shared base is positioned at a predetermined position on the frame.

7. The integrated transmitter-receiver module of claim 6, wherein the frame comprises a positioning mechanism, wherein the shared base is configured to engage with the positioning mechanism in order to assemble the integrated transmitter-receiver module to the LiDAR assembly.

8. The integrated transmitter-receiver module of claim 7, wherein the positioning mechanism comprises a pair of guideways, wherein the shared base is configured to slide on the guideways in order to guide the integrated transmitter-receiver module to the predetermined position on the frame.

9. The integrated transmitter-receiver module of claim 8, wherein the pair of guideways further comprise lock points, wherein the shared base comprises stop points corresponding to the lock points, wherein the stop points are configured to stop the integrated transmitter-receiver module at the lock points when sliding on the guideways.

10. The integrated transmitter-receiver module of claim 8, wherein the frame further comprises a first set of fastening holes, wherein the shared base further comprises a second set of fastening holes, corresponding to the first set of fastening holes, wherein the first and the second sets of fastening holes are used to affix the integrated transmitter-receiver module to the frame after the integrated transmitter-receiver module reaches the predetermined position on the frame.

11. The integrated transmitter-receiver module of claim 1, wherein the laser emitter is disposed on the shared base towards a first direction, wherein the receiver is disposed on the shared base towards a second direction, orthogonal to the first direction.

12. The integrated transmitter-receiver module of claim 1, wherein the laser emitter and the receiver are glued to the shared base at predetermined positions.

13. A method for making an integrated transmitter-receiver module for a LiDAR assembly, comprising:
    aligning a laser emitter configured to emit optical signals to an environment surrounding the LiDAR assembly and a receiver configured to detect returned optical signals from the environment, such that the returned optical signals are focused on one or more detectors of the receiver; and
    pre-affixing the aligned laser emitter and the receiver on a shared base to form the integrated transmitter-receiver module, wherein the integrated transmitter-receiver module is assembled to the LiDAR assembly through a frame.

14. The method of claim 13, wherein aligning the laser emitter and the receiver further comprises:
    focusing the emitted optical signal to a center of optics such that the optical signal is emitted at a predetermined direction towards the optics.

15. The method of claim 13, wherein pre-affixing the aligned laser emitter and the receiver on the shared base further comprises:
    disposing the laser emitter on the shared base towards a first direction; and
    disposing the receiver on the shared base toward a second direction, orthogonal to the first direction.

16. The method of claim 13, wherein pre-affixing the aligned laser emitter and the receiver on a shared base further comprises:
    gluing the laser emitter and the receiver to the shared base at predetermined positions.

17. A method for assembling an integrated transmitter-receiver module to a LiDAR assembly, the integrated transmitter-receiver module comprising a laser emitter and a receiver pre-aligned and disposed on a shared base, the method comprising:
- securing the integrated transmitter-receiver module through the shared base to a pair of guideways on a frame of the LiDAR assembly;
- sliding the integrated transmitter-receiver module on the pair of guideways to a predetermined position on the frame; and
- affixing the integrated transmitter-receiver module to the frame through the pair of guideways after the integrated transmitter-receiver module reaches the predetermined position on the frame.

18. The method of claim 17, wherein sliding the integrated transmitter-receiver module on the pair of guideways to the predetermined position on the frame further comprises:
- stopping the integrated transmitter-receiver module at lock points of the pair of guideways.

19. The method of claim 17, wherein affixing the integrated transmitter-receiver module to the frame further comprises:
- screwing the integrated transmitter-receiver module to the frame through a first set of fastening holes on the shared base and a second set of fastening holes on the frame.

20. The method of claim 17, further comprising:
- operatively coupling the integrated transmitter-receiver module to a control module configured to control the integrated transmitter-receiver module through an interface module.

* * * * *